(12) United States Patent
Segawa et al.

(10) Patent No.: US 12,085,154 B2
(45) Date of Patent: Sep. 10, 2024

(54) BALL SCREW DEVICE

(71) Applicant: NSK LTD., Tokyo (JP)

(72) Inventors: Ryo Segawa, Fujisawa (JP); Kazutaka Tanaka, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/265,810

(22) PCT Filed: Jun. 22, 2022

(86) PCT No.: PCT/JP2022/024911
§ 371 (c)(1),
(2) Date: Jun. 7, 2023

(87) PCT Pub. No.: WO2023/276822
PCT Pub. Date: Jan. 5, 2023

(65) Prior Publication Data
US 2024/0052915 A1 Feb. 15, 2024

(30) Foreign Application Priority Data

Jul. 1, 2021 (JP) .................. 2021-109832
Aug. 24, 2021 (JP) .................. 2021-136413

(51) Int. Cl.
*F16H 25/20* (2006.01)
*F16H 25/22* (2006.01)
*F16H 25/24* (2006.01)

(52) U.S. Cl.
CPC ......... *F16H 25/2214* (2013.01); *F16H 25/24* (2013.01); *F16H 2025/2075* (2013.01)

(58) Field of Classification Search
CPC ...... F16H 25/2214; F16H 25/20; F16H 25/24; F16H 2025/2075; F16D 2125/40; F16D 1/116
See application file for complete search history.

(56) References Cited

U.S. PATENT DOCUMENTS

| 11,209,060 B2 * | 12/2021 | Chelaidite ............. F16D 55/226 |
| 2012/0079902 A1 * | 4/2012 | Osterlanger ............ F16D 65/18 74/89.23 |

(Continued)

FOREIGN PATENT DOCUMENTS

| DE | 10 2011 050814 B3 | 8/2012 |
| JP | 10-119795 A | 5/1998 |

(Continued)

OTHER PUBLICATIONS

International Search Report for PCT/JP2022/024911 dated Sep. 13, 2022.

(Continued)

*Primary Examiner* — Zakaria Elahmadi
(74) *Attorney, Agent, or Firm* — Sughrue Mion, PLLC

(57) ABSTRACT

A ball screw device has: a screw shaft rotationally moving during use, a nut having a protruding non-rotating side engaging portion at an end portion on one side in an axial direction, the nut linearly moving during use, balls arranged between a shaft-side and nut-side grooves, and a driving member fixed to the screw shaft having an arc-shaped rotating-side engaging groove portion into which the non-rotating side engaging portion can be inserted in the axial direction, and which can be engaged with the non-rotating side engaging portion in a circumferential direction.

13 Claims, 35 Drawing Sheets

(56) References Cited

U.S. PATENT DOCUMENTS

2012/0085139 A1\* 4/2012 Osterlanger ............ F16D 65/18
 72/340
2012/0247240 A1 10/2012 Kawahara et al.
2014/0090501 A1\* 4/2014 Kuster ...................... F16D 1/10
 74/424.75
2018/0058553 A1\* 3/2018 Kick-Rodenbuecher ...................
 F16H 25/2015

FOREIGN PATENT DOCUMENTS

JP 2013-100921 A 5/2013
JP 2016-70281 A 5/2016

OTHER PUBLICATIONS

Written Opinion for PCT/JP2022/024911 dated Sep. 13, 2022.
Extended European Search Report dated Dec. 5, 2023 in European Application No. 22832970.2.

\* cited by examiner

OTHER SIDE IN THE AXIAL DIRECTION

ONE SIDE IN THE AXIAL DIRECTION

OTHER SIDE IN THE CIRCUMFERENTIAL DIRECTION

ONE SIDE IN THE CIRCUMFERENTIAL DIRECTION

BALL SCREW DEVICE

CROSS REFERENCE TO RELATED APPLICATIONS

This application is a National Stage of International Application No. PCT/JP2022/024911 filed Jun. 22, 2022, claiming priority based on Japanese Patent Application No. 2021-109832 filed Jul. 1, 2021 and Japanese Patent Application No. 2021-136413 filed Aug. 24, 2021.

TECHNICAL FIELD

The present invention relates to a ball screw device.

BACKGROUND ART

A ball screw device is one of the machine element parts for converting linear motion to rotational motion or rotational motion to linear motion. Since balls roll between a screw shaft and a nut, a higher efficiency can be obtained compared to a sliding screw device in which a screw shaft is in direct contact with a nut. Therefore, in order to convert rotational motion of a driving source such as an electric motor to linear motion, the ball screw device is assembled in various mechanical devices such as an electric braking device and an automatic manual transmission (AMT) of an automobile and a positioning device of a machine tool.

The ball screw device has a screw shaft having a shaft-side ball thread groove having a spiral shape on the outer-circumferential surface, a nut having a nut-side ball thread groove having a spiral shape on the inner-circumferential surface, and balls arranged between the shaft-side ball thread groove and the nut-side ball thread groove. In the ball screw device, either one of the screw shaft or the nut is used as a rotational motion element and the other of the screw shaft and the nut is used as a linear motion element, depending on the application.

In the ball screw device, the stroke end of the linear motion element is regulated in order to prevent the linear motion element from linearly moving beyond a predetermined range. FIG. 35 illustrates a ball screw device 100 having a conventional structure for regulating the stroke end of the linear motion element described in JP 2016-070281A.

The ball screw device 100 includes a screw shaft 101, a nut 102, balls (not illustrated), and a stopper 103.

The screw shaft 101 has a screw portion 104, and a fitting shaft portion 105 arranged adjacent to one side in the axial direction of the screw portion 104. A shaft-side ball thread groove having a spiral shape 106 is formed on the outer-circumferential surface of the screw portion 104. The fitting shaft portion 105 has an outer diameter smaller than that of the screw portion 104, and has male spline teeth on the outer-circumferential surface. The screw shaft 101 is arranged coaxially with the nut 102 in a state where the screw portion 104 is inserted inside the nut 102.

The nut 102 has a cylindrical shape, and has a nut-side ball thread groove having a spiral shape and a circulation groove having a substantially S-shape on the inner-circumferential surface (not illustrated). The nut 102 has an engaging portion 107 at an end portion on the one side in the axial direction.

The shaft-side ball thread groove 106 and the nut-side ball thread groove are arranged so as to face each other in the radial direction to form a load path having a spiral shape. The start point and the end point of the load path are connected by the circulation groove formed on the inner-circumferential surface of the nut 102. Therefore, the balls that have reached the end point of the load path are returned to the start point of the load path through the circulation groove. Here, the start point and the end point of the load path are interchanged depending on the direction of relative displacement in the axial direction between the screw shaft 101 and the nut 102.

The stopper 103 has a boss portion 108 having an annular shape and a claw portion 109 having a projection shape. The boss portion 108 is externally fitted to the fitting shaft portion 105 of the screw shaft 101 so as not to be able to rotate relative to the fitting shaft portion 105. Specifically, the boss portion 108 is externally fitted to the fitting shaft portion 105 so as not to be able to rotate relative to the fitting shaft portion 105 by spline-engaging female spline teeth formed on the inner-circumferential surface with the male spline teeth formed on the outer-circumferential surface of the fitting shaft portion 105. The claw portion 109 protrudes in the radial direction from a part in the circumferential direction of the outer-circumferential surface of the boss portion 108.

In the ball screw device 100 having a conventional structure, when the linear motion element of either the screw shaft 101 or the nut 102 linearly moves and reaches the stroke end, the engaging portion 107 provided in the nut 102 and the claw portion 109 provided in the stopper 103 engage in the circumferential direction. As a result, rotation of the rotational motion element of either the screw shaft 101 or the nut 102 is prevented, and it becomes possible to regulate the stroke end of the linear motion element.

CITATION LIST

Patent Literature

Patent Literature 1: JP 2016-070281A

SUMMARY OF THE INVENTION

Technical Problem

In the ball screw device 100 having a conventional structure described in JP 2016-070281A, the stopper 103, which is a dedicated component, is used for regulating the stroke end of the linear motion element. Therefore, for example, when the screw shaft 101 is used as a rotational motion element and the nut 102 is used as a linear motion element, a driving member for rotationally driving the screw shaft 101 is required to be provided separately from the stopper 103. As a result, the number of parts increases, and the ball screw device 100 tends to be large.

Further, in the ball screw device 100 having a conventional structure described in JP 2016-070281A, the stopper 103 may be elastically deformed when the engaging portion 107 provided in the nut 102 and the claw portion 109 provided in the stopper 103 are engaged in the circumferential direction, and the screw shaft 101 may be twisted between the stopper 103 and the driving member, and the driving member may stop after the screw shaft 101 rotates by that amount accordingly. Thus, the rotation stop position of the driving member may deviate from the initial position. As a result, it becomes difficult to strictly manage the axial position (stroke amount) of the nut 102, and the controllability of the ball screw device 100 may deteriorate.

The present invention has been made to solve the above problems, and the objective of the present invention is to provide a ball screw device capable of regulating the stroke end of the nut, which is a linear motion element, with a small number of parts so as to make the ball screw device more compact and improve the controllability.

Solution to Problem

The ball screw device of one aspect of the present invention includes a screw shaft, a nut, balls, and a driving member.

The screw shaft has a shaft-side ball thread groove having a spiral shape on an outer-circumferential surface thereof and rotationally moves during use.

The nut has a nut-side ball thread groove having a spiral shape on an inner-circumferential surface and a non-rotating side engaging portion having a protruding shape at an end portion on one side in an axial direction, and linearly moves during use.

Balls are arranged between the shaft-side ball thread groove and the nut-side ball thread groove.

The driving member is fixed to the screw shaft so as not to be able to rotate relative to the screw shaft, and rotationally drives the screw shaft.

In the ball screw device of one aspect of the present invention, the driving member has an arc-shaped rotating-side engaging groove portion into which part or entire of the non-rotating side engaging portion can be inserted in the axial direction, and which can be engaged with the non-rotating side engaging portion in a circumferential direction at an end portion in the circumferential direction thereof.

In the ball screw device of one aspect of the present invention, the rotating-side engaging groove portion may be a through groove that penetrates the driving member in the axial direction or a bottomed groove that is open to a side surface on the other side in the axial direction of the driving member.

In the ball screw device of one aspect of the present invention, the rotating-side engaging groove portion may be a bottomed groove having a constant depth in the axial direction.

In the ball screw device of one aspect of the present invention, the rotating-side engaging groove portion may be a bottomed groove whose depth in the axial direction changes in the circumferential direction.

In this case, an inclination angle of a groove bottom surface of the rotating-side engaging groove portion with respect to a virtual plane perpendicular to a center axis of the driving member may be equal to a lead angle of the shaft-side ball thread groove or to be smaller than the lead angle of the shaft-side ball thread groove.

In the ball screw device of one aspect of the present invention, the rotating-side engaging groove portion is configured by two or more rotating-side engaging groove portions.

In this case, the two or more rotating-side engaging groove portions may be arranged so as to be evenly spaced in the circumferential direction of the driving member.

Here, in this case, the non-rotating side engaging portion is configured by one non-rotating side engaging portion, or by the same number of non-rotating side engaging portions as the two or more rotating-side engaging groove portions.

In the ball screw device of one aspect of the present invention, a size of a center angle of the rotating-side engaging groove portion may be 36 degrees or more and 324 degrees or less.

In the ball screw device of one aspect of the present invention, a size of a center angle of the rotating-side engaging groove portion may be larger than a size of a center angle of the non-rotating side engaging portion.

In the ball screw device of one aspect of the present invention, a size of a center angle of a portion of the driving member that is deviated in the circumferential direction from the rotating-side engaging groove portion may be larger than a size of a center angle of the non-rotating side engaging portion.

In the ball screw device of one aspect of the present invention, the rotating-side engaging groove portion may have a reinforcing portion in an intermediate portion in the circumferential direction thereof that radially connects an inner-side surface on an outer-side in a radial direction and an inner-side surface on an inner-side in the radial direction.

In the ball screw device of one aspect of the present invention, the driving member may have a torque input portion on an outer-circumferential surface thereof.

In this case, the screw shaft has a screw portion having the shaft-side ball thread groove formed on an outer-circumferential surface thereof and a fitting shaft portion which is arranged on the one side in the axial direction and to which the driving member is externally fitted and fixed so as not to be able to rotate relative to the driving member, and the torque input portion may be arranged at a position radially overlapping a portion of the rotating-side engaging groove portion that engages with the non-rotating side engaging portion.

In this case, the driving member may be one of a gear, a pulley, and a sprocket.

In the ball screw device of one aspect of the present invention, the driving member may be configured by a motor shaft.

Effect of Invention

With the ball screw device of one aspect of the present invention, regulation of the stroke end of the nut, which is a linear motion element, can be achieved with a small number of parts, and the ball screw device can be more compact, and the controllability can be improved.

DESCRIPTION OF THE EMBODIMENTS

First Example

Figure 1:
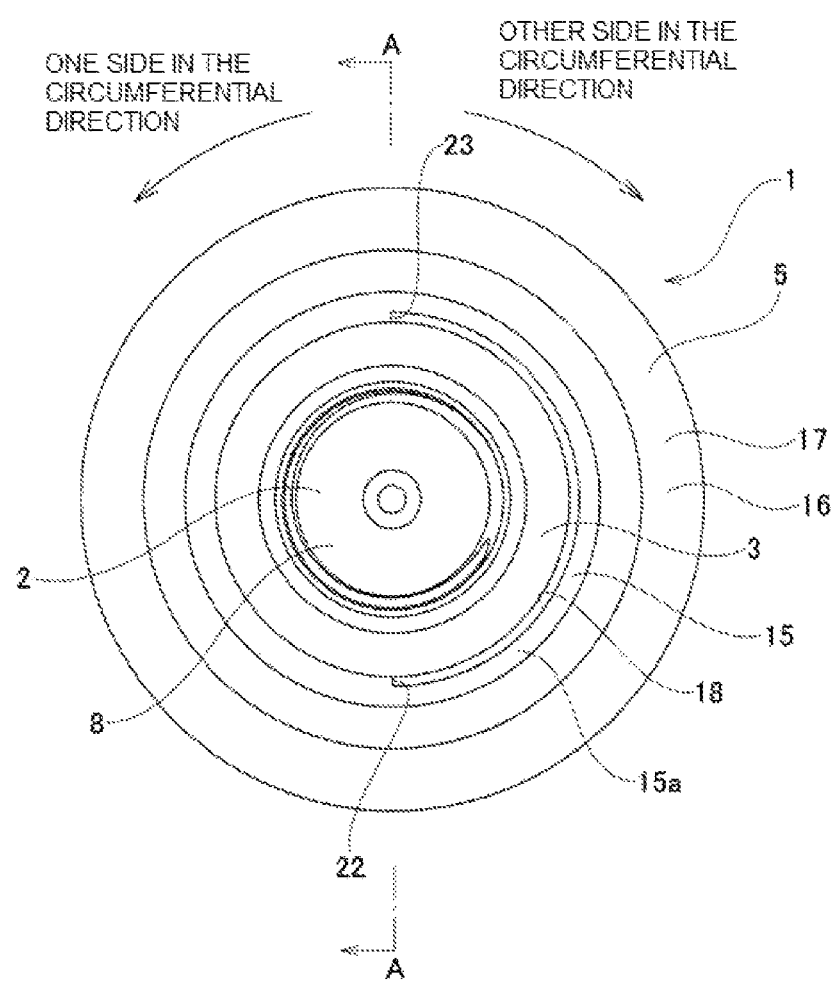
FIG. 1 is a front view of a ball screw device according to a first example of an embodiment of the present invention as viewed from the other side in the axial direction.

A first example of an embodiment of the present invention will be described with reference to FIG. 1 to FIG. 8.

[Overall Configuration of Ball Screw Device]

The ball screw device 1 of this example is incorporated in, for example, an electric booster device and is used for applications such as converting rotational motion of an electric motor, which is a driving source, into linear motion to operate a piston of a hydraulic cylinder.

The ball screw device 1 includes a screw shaft 2, a nut 3, balls 4, and a driving member 5.

The screw shaft 2 is a rotational motion element that is rotationally driven by a driving source (not illustrated) through the driving member 5 and rotationally moves during use. The screw shaft 2 is inserted inside the nut 3 and arranged coaxially with the nut 3. The nut 3 is a linear motion element that is prevented from co-rotating with respect to the screw shaft 2 by an anti-rotation mechanism (not illustrated) and linearly moves during use. Therefore, the ball screw device 1 of this example is used in an aspect wherein the screw shaft 2 is rotationally driven and the nut 3 is linearly moved.

A load path 6 having a spiral shape is provided between the outer-circumferential surface of the screw shaft 2 and the inner-circumferential surface of the nut 3. Balls 4 are arranged in the load path 7 so as to be able to roll. When the screw shaft 2 and the nut 3 are relatively rotated, the balls 4 that have reached the end point of the load path 6 are returned to the start point of the load path 6 through a circulation groove 7 formed on the inner-circumferential surface of the nut 3. The structures of the components of the ball screw device 1 will be described below.

In the description of an embodiment of the present invention including this example, the axial direction, the radial direction, and the circumferential direction mean, unless specified otherwise, the axial direction, the radial direction, and the circumferential direction in relation to the screw shaft 2. One side in the axial direction is referred to as the right side in FIG. 2 to FIG. 5, and the other side in the axial direction is referred to as the left side in FIG. 2 to FIG. 5. The embodiment of the present invention is characterized by regulation of the stroke end of the nut 3, which is a linear motion element, on the one side in the axial direction. It is noted that one side in the circumferential direction means the direction of rotation of the screw shaft 2 that allows the nut 3 to linearly move to the one side in the axial direction.

[Screw Shaft]

The screw shaft 2 is made of metal, and has a screw portion 8 and a fitting shaft portion 9 arranged adjacent to the one side in the axial direction of the screw portion 8. The screw portion 8 and the fitting shaft portion 9 are coaxially arranged and integrally configured with each other. The fitting shaft portion 9 has an outer diameter smaller than that of the screw portion 8.

The screw portion 8 has a shaft-side ball thread groove 10 having a spiral shape on the outer-circumferential surface. The shaft-side ball thread groove 10 is formed by performing a grinding process, cutting process, or a rolling process to the outer-circumferential surface of the screw portion 9. In this example, the number of threads of the shaft-side ball thread groove 10 is one. The groove shape (groove bottom shape) of the shaft-side ball thread groove 10 is a Gothic arch shape or a circular arc shape. In this example, the direction of formation (winding direction) of the shaft-side ball thread groove 10 is regulated to the direction in which the nut 3 is linearly moved to the one side in the axial direction when the screw shaft 2 is rotated to the one side in the circumferential direction.

The fitting shaft portion 9 has male spline teeth 11 on the outer-circumferential surface over the entire circumference. Due to this, the fitting shaft portion 9 is a spline shaft portion. In the illustrated example, the male spline teeth 11 are configured by involute spline teeth, but they can also be configured by angular spline teeth.

The screw shaft 2 is arranged coaxially with the nut 3 in a state where the screw portion 8 is inserted inside the nut 3. In this example, the screw shaft 2 is configured by the screw portion 8 and the fitting shaft portion 9, however, in a case of implementing the present invention, it is possible to further provide the screw shaft with a supporting shaft portion (second fitting shaft portion) for fixing a rolling bearing or the like to be rotatably supported with respect to the housing or the like, and a spline or a serration that function as torque transmission parts, and so on.

[Nut]

The nut 3 is made of metal and is configured to be cylindrical as a whole. The nut 3 has a nut-side ball thread groove 12 having a spiral shape and a circulation groove 7 on the inner-circumferential surface.

The nut-side ball thread groove 12 has a spiral shape, and is formed by performing, for example. a grinding process, cutting process, a rolling tapping process, or cutting tapping process to the inner-circumferential surface of the nut 3. The nut-side ball thread groove 12 has the same lead as the shaft-side ball thread groove 10. Therefore, in a state where the screw portion 8 of the screw shaft 2 is inserted inside the nut 3, the shaft-side ball thread groove 10 and the nut-side ball thread groove 12 are arranged so as to face each other in the radial direction to form the load path 6 having a spiral shape. The number of threads of the nut-side ball thread groove 12 is one, as the same as that of the shaft-side ball thread groove 10. The groove shape of the nut-side ball thread groove 12 is a Gothic arch shape or a circular arc shape as the same as the shaft-side ball thread groove 10.

The circulation groove 7 has a substantially S-shape, and is formed on the inner-circumferential surface of the nut 3 by, for example, a forging process or cold forging process. The circulation groove 7 smoothly connects axially adjacent portions of the nut-side ball thread groove 12 and connects the start point and the end point of the load path 6. Therefore, the balls 4 that have reached the end point of the load path 6 are returned to the start point of the load path 6 through the circulation groove 7. Here, the start point and the end point of the load path 6 are interchanged depending on the direction of relative rotation that is a direction of relative displacement between the screw shaft 2 and the nut 3 with respect to the axial direction.

The circulation groove 7 has a semi-circular cross-sectional shape. The circulation groove 7 has a groove width slightly larger than the diameter of the balls 4 and a groove depth that allows the balls 4 moving in the circulation groove 7 to climb over the threads of the shaft-side ball thread groove 10.

The nut 3 has a non-rotating side engaging portion 13 having a protruding shape at an end portion on the one side in the axial direction. The non-rotating side engaging portion 13 is provided on a portion in the circumferential direction of a side surface 3a on the one side in the axial direction of the nut 3, and protrudes toward the one side in the axial direction. The non-rotating side engaging portion 13 has a fan column shape.

Figure 4:
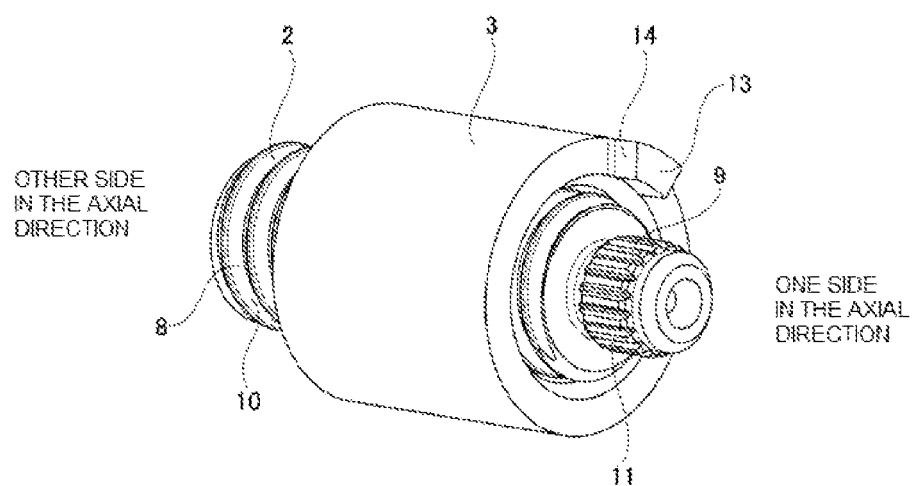
FIG. 4 is a perspective view of the ball screw device according to the first example.
Figure 5:
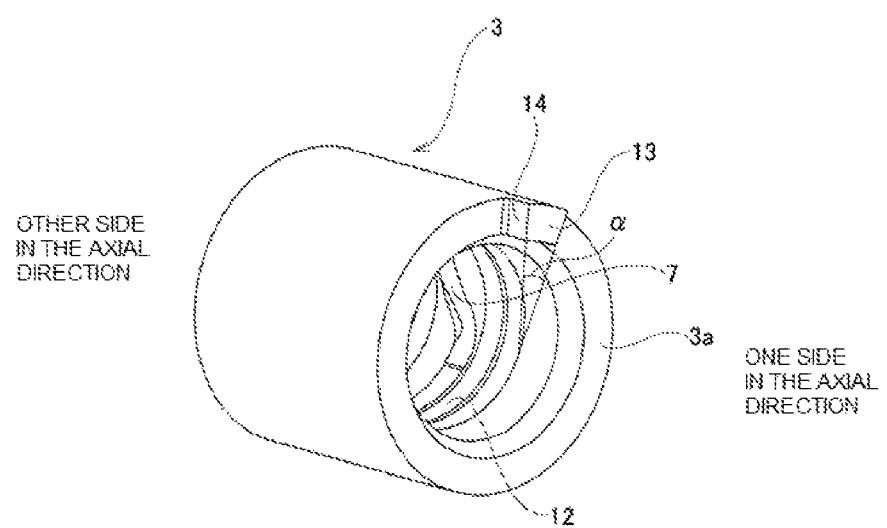
FIG. 5 is a perspective view of a nut of the ball screw device according to the first example.
Figure 8:
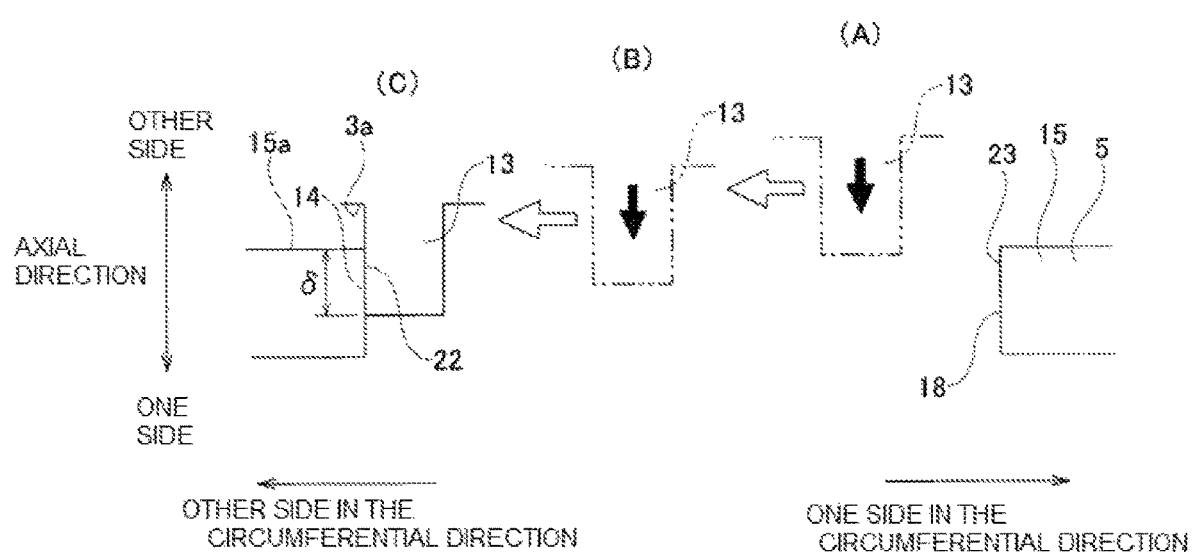
FIG. 8 is a schematic view related to the ball screw device according to the first example, illustrated in order to describe the positional relationship in the axial direction and the circumferential direction between the non-rotating side engaging portion and the rotating-side engaging groove portion in the vicinity of the stroke end of the nut.

The non-rotating side engaging portion 13 has a flat non-rotating side stopper surface 14 on a side surface on the other side in the circumferential direction (the side surface on the front side in FIG. 4 and FIG. 5, and the left side surface in FIG. 8). The non-rotating side stopper surface 14 is arranged so as to be substantially parallel to the center axis of the nut 3. Further, the tip-end surface of the non-rotating side engaging portion 13 (end surface on the one side in the axial direction) exists on a virtual plane perpendicular to the center axis of the nut 3.

The dimension in the axial direction of the non-rotating side engaging portion 13 (non-rotating side stopper surface 14) can be set to a dimension equal to or larger than the lead of the shaft-side ball thread groove 10. The formation range of the non-rotating side engaging portion 13 in the circumferential direction is appropriately determined in a range in which interference with a side surface 15a on the other side in the axial direction of the base plate portion 15, which will be described later, can be prevented, and a force applied from the rotating-side stopper surface 22 to the non-rotating side stopper surface 14 can be supported. That is, the formation range (center angle α) in the circumferential direction of the non-rotating side engaging portion 13 can be made smaller than the formation range (center angle θ) in the circumferential direction of the rotating-side engaging groove portion 18, which will be described later. Therefore, the relationship α<θ is satisfied. In this example, the non-rotating side engaging portion 13 is formed in a range of about 1/12 of the entire side surface 3a on the one side in the axial direction.

In this example, although the nut 3 is integrally configured as a whole including the non-rotating side engaging portion 13, in a case of implementing the present invention, the nut can also be configured by connecting and fixing a cylindrical member having a nut-side ball thread groove and a circulation groove on the inner-circumferential surface and a non-rotating side engaging portion.

The ball screw device 1 of this example uses the nut 3 as a linear motion element. Therefore, in this example, an anti-rotation mechanism (not illustrated) is used to prevent the nut 3 from rotating. As the anti-rotation mechanism, conventionally known various structures can be adopted. For example, a structure in which a protrusion or a key provided on the inner-circumferential surface of a fixed member such as a housing are engaged with a concave groove that is formed in the axial direction on the outer-circumferential surface of the nut 3 may be adopted.

[Balls]

The balls 4 are steel balls having a predetermined diameter, and are arranged in the load path 6 and the circulation groove 7 so as to be able to roll. The balls 4 arranged in the load path 6 roll while receiving a compressive load, whereas the balls 4 arranged in the circulation groove 7 are pushed by the succeeding balls 4 and roll without receiving a compressive load.

[Driving Member]

The driving member 5 rotationally drives the screw shaft 2 by transmitting torque input from a driving source such as an electric motor to the screw shaft 2. The driving member 5 of this example has not only a function of rotationally driving the screw shaft 2 but also a function of regulating the stroke end of the nut 3, which is a linear motion element.

In the ball screw device 1 of this example, when the driving member 5 is rotationally driven toward the one side in the circumferential direction, the nut 3 moves toward the one side in the axial direction relative to the screw shaft 2. On the other hand, when the driving member 5 is rotationally driven toward the other side in the circumferential direction, the nut 3 moves toward the other side in the axial direction relative to the screw shaft 2.

The driving member 5 has a base plate portion 15, a cylindrical portion 16, a torque input portion 17, and a rotating-side engaging groove portion 18. The driving member 5 is made of metal such as carbon steel or stainless steel, or made of synthetic resin. As the driving member 5, for example, a gear, a pulley, a sprocket, or the like can be applied.

The base plate portion 15 has a circular plate shape. The base plate portion 15 has a mounting hole 19 that penetrates in the axial direction in the central portion in the radial direction. Female spline teeth 20 are formed on the inner-circumferential surface of the mounting hole 19. The base plate portion 15 is externally fitted and fixed to the fitting shaft portion 9 so as not to be able to rotate relative to the fitting shaft portion 9 by spline-engaging the female spline teeth 20 formed on the inner-circumferential surface of the mounting hole 19 with the male spline teeth 11 formed on the outer-circumferential surface of the fitting shaft portion 9. The inner-side portion in the radial direction of the side surface 15a on the other side in the axial direction of the base plate portion 15 abuts or closely faces the end surface the end surface on the one side in the axial direction of the screw portion 8 of the screw shaft 2.

The cylindrical portion 16 has a cylindrical shape and is provided at an end portion on the outside in the radial direction of the driving member 5. The end portion on the one side in the axial direction of the cylindrical portion 16 is connected to the end portion on the outside in the radial direction of the base plate portion 15. The cylindrical portion 16 has an inner diameter larger than that of the outer diameter of the nut 3. The cylindrical portion 16 covers around the end portion on the one side in the axial direction of the screw portion 8.

The torque input portion 17 is provided on the outer-circumferential surface of the driving member 5. In this example, the torque input portion 17 is provided on the outer-circumferential surface of the cylindrical portion 16. Therefore, the torque input portion 17 is arranged at a position overlapping the screw portion 8 in the radial direction. In the illustrated example, the outer diameter of the portion of the cylindrical portion 16 where the torque input portion 17 is provided is larger than the outer diameter of the portions shifted in the axial direction from the torque input portion 17. That is, the torque input portion 17 is provided at a large diameter portion of the cylindrical portion 16.

The torque input portion 17 serves as a gear portion when a gear is applied as the driving member 5, and as a belt receiving surface (tooth portion) on which a belt is stretched when a pulley is applied as the driving member 5, and as a tooth portion on which a chain is stretched when a sprocket is applied as the driving member 5. In either case, the torque from the driving source is input to the torque input portion 17.

The rotating-side engaging groove portion 18 allows the non-rotating side engaging portion 13 having the protruding shape to be inserted in the axial direction, and can be engaged with the non-rotating side engaging portion 13 in the circumferential direction on the other side in the circumferential direction. The rotating-side engaging groove portion 18 has an arch shape (C-shape) when viewed in the axial direction, and is provided at an intermediate portion in the radial direction of the side surface 15a on the other side in the axial direction of the base plate portion 15. The rotating-side engaging groove portion 18 is formed by, for example, performing a cutting process or a forging process to the side surface 15a on the other side in the axial direction of the base plate portion 15.

The rotating-side engaging groove portion 18 is a through groove that penetrates the base plate portion 15 in the axial direction.

The rotating-side engaging groove portion 18 has a width dimension in the radial direction that allows the non-rotating side engaging portion 13 to be inserted in the axial direction. Therefore, the inner-side surface 21a on the outer-side in the radial direction of the rotating-side engaging groove portion 18 has a partially concave cylindrical surface shape centered on the center axis of the driving member 5, and has an inner diameter slightly larger than the diameter of a circumscribed circle passing through the outer-circumferential surface of the non-rotating side engaging portion 13. Further, the inner-side surface 21b on the inner-side in the radial direction of the rotating-side engaging groove portion 18 has a partially convex cylindrical surface shape centered on the center axis of the driving member 5, and has an outer diameter slightly smaller than the diameter of an inscribed circle passing through the inner-circumferential surface of the non-rotating side engaging portion 13. The inner-side surface 21a on the outer-side in the radial direction and the inner-side surface 21b on the inner-side in the radial direction of the rotating-side engaging groove portion 18 are concentrically arranged.

The rotating-side engaging groove portion 18 has a flat rotating-side stopper surface 22 facing in the circumferential direction at the end portion on the other side in the circumferential direction. The rotating-side stopper surface 22 comes into surface contact with the non-rotating side stopper surface 14 when the nut 3 has moved to the one side in the axial direction relative to the screw shaft 2 and reached the stroke end. For this reason, the rotating-side stopper surface 22 exists on a virtual plane including the center axis of the driving member 5. In order to be able to identify the position in the circumferential direction (phase) of the rotating-side stopper surface 22 when externally fitting and fixing the driving member 5 to the fitting shaft portion 9 of the screw shaft 2, the outer surface of the driving member 5 may be provided with an externally recognizable identification mark (symbol), or may be formed with an externally recognizable identification shape such as a recess, hole, groove, or a width across flat shape.

The dimension in the axial direction of the rotating-side stopper surface 22 is the same as the thickness dimension in the axial direction of the base plate portion 15. The dimension in the axial direction of the rotating-side stopper surface 22 is set to a size that ensures sufficient engagement allowance δ (width in the axial direction of the contact portion with the non-rotating side stopper surface 14) to prevent the rotation of the screw shaft 2 between the non-rotating side stopper surface 14 of the non-rotating side engaging portion 13. In this example, the dimension in the axial direction of the rotating-side stopper surface 22 is larger than the dimension in the axial direction of the non-rotating side engaging portion 13 (non-rotating side stopper surface 14).

The rotating-side engaging groove portion 18 has a flat stepped surface 23 facing in the circumferential direction at an end portion on the one side in the circumferential direction.

Figure 6:
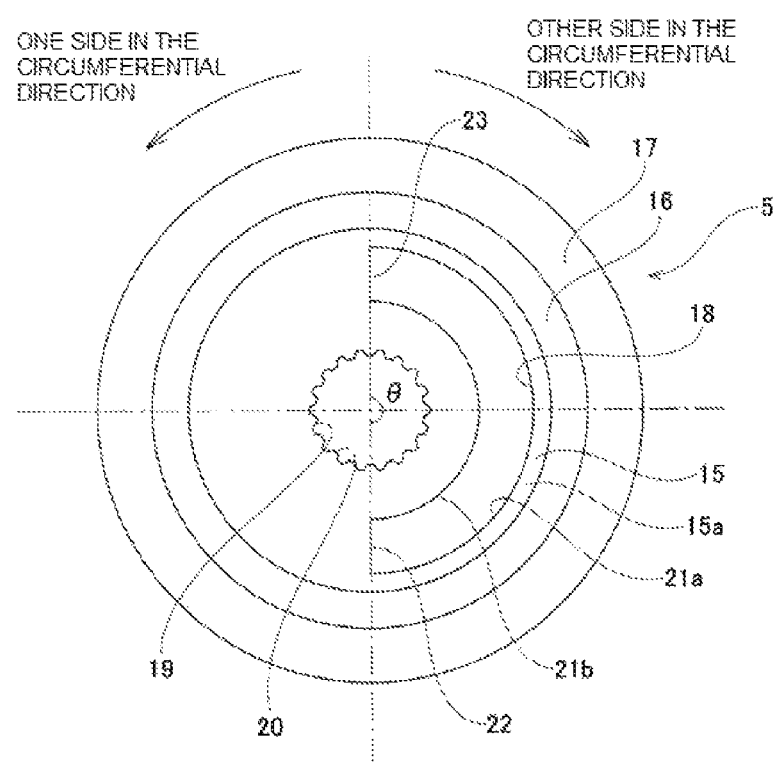
FIG. 6 is a front view of a driving member of the ball screw device according to the first example as viewed from the other side in the axial direction.
Figure 7:
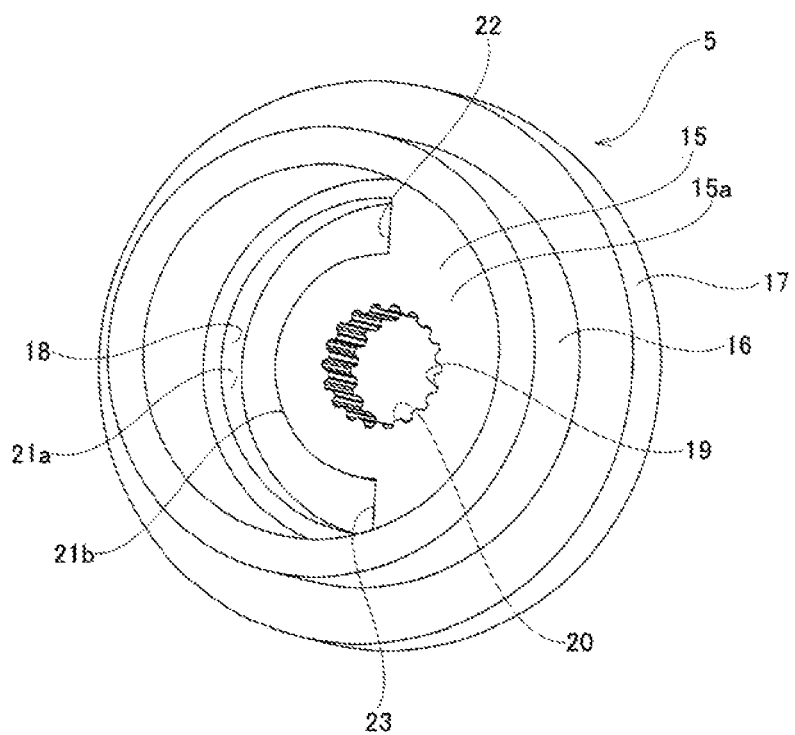
FIG. 7 is a perspective view of the driving member illustrated in FIG. 6.

In this example, as illustrated in FIG. 6 and FIG. 7, the size of the center angle θ of the rotating-side engaging groove portion 18 is approximately 180 degrees. For this reason, the rotating-side engaging groove portion 18 is formed in a half area of the entire base plate portion 15.

The formation range (center angle θ) of the rotating-side engaging groove portion 18 in the circumferential direction has a correlation with the size of the engagement allowance δ between the non-rotating side stopper surface 14 and the rotating-side stopper surface 22. For example, when the center angle θ of the rotating-side engaging groove portion 18 is increased, the engagement allowance δ tends to increase, and when the center angle θ of the rotating-side engaging groove portion 18 is decreased, the engagement allowance δ tends to decrease. However, when the center angle θ of the rotating-side engaging groove portion 18 becomes too large, the nut 3 reaches the stroke end on the one side in the axial direction, the clearance in the axial direction between the side surface 3a on the one side in the axial direction of the nut 3 and the side surface 15a on the other side in the axial direction of the driving member 5 becomes small in a state where the non-rotating side stopper surface 14 and the rotating-side stopper surface 22 are engaged, and therefore the nut 3 and the driving member 5 are likely to interference with each other. Therefore, the center angle θ of the rotating-side engaging groove portion 18 is required to be set to a size where the minimum necessary engagement allowance δ can be secured to prevent the rotation of the screw shaft 2, and interference between the nut 3 and the driving member 5 can be prevented.

Specifically, in order to prevent the screw shaft 2 from rotating, it is desirable to ensure that the size of the engagement allowance δ is 1/10 (10%) or more of the lead of the shaft-side ball thread groove 10. As a result, the lower limit of the center angle θ of the rotating-side engaging groove portion 18 can be set to 36 degrees.

On the other hand, in order to prevent interference between the nut 3 and the driving member 5, the size of the clearance in the axial direction between the side surface 3a on the one side in the axial direction of the nut 3 and the side surface 15a on the other side in the axial direction of the base plate portion 15 in a state where the non-rotating side stopper surface 14 and the rotating-side stopper surface 22 are engaged is desired to be 1/10 (10%) or more of the lead of the shaft-side ball thread groove 10. Therefore, the upper limit of the center angle θ of the rotating-side engaging groove portion 18 can be set to 324 degrees. When the center angle θ of the rotating-side engaging groove portion 18 is set to 324 degrees, the size of the engagement allowance δ can be secured up to 9/10 (90%) of the lead of the shaft-side ball thread groove 10 at maximum.

As described above, the center angle θ of the rotating-side engaging groove portion 18 can be set within the rage of 36 degrees or more and 324 degrees or less.

Further, in order to secure the strength of the driving member 5, the size of the center angle (360-θ) of the portion of the base plate portion 15 that is deviated in the circumferential direction from the rotating-side engaging groove portion 18 is secured to some extent. In this example, the center angle (360-θ) of the portion deviated in the circumferential direction from the rotating-side engaging groove portion 18 is set larger than the center angle (a) of the non-rotating side engaging portion 13. That is, the relationship 360-θ>α is satisfied. Therefore, in this example, the center angle α of the non-rotating side engaging portion 13 and the center angle θ of the rotating-side engaging groove portion 18 satisfy the relationship α<θ<360-α.

[Explanation of the Operation of the Ball Screw Device]

In the ball screw device 1 of this example, the nut 3 is linearly moved by rotationally driving the screw shaft 2 through the driving member 5 by a driving source (not illustrated). In particular, in the ball screw device 1 of this example, when the driving member 5 (screw shaft 2) is rotationally driven toward the one side in the circumferential direction through the torque input portion 17 provided in the driving member 5, the nut 3 moves to the one side in the axial direction relative to the screw shaft 2. On the other hand, when the driving member 5 (screw shaft 2) is rotationally driven toward the other side in the circumferential direction through the torque input portion 17, the nut 3 moves to the other side in the axial direction relative to the screw shaft 2.

When the nut 3 moves to the one side in the axial direction relative to the screw shaft 2 and approaches the stroke end, as illustrated as (A) in FIG. 8, the end portion on the one side in the axial direction (tip end portion) of the non-rotating side engaging portion 13 enters inside the rotating-side engaging groove portion 18 provided in the driving member 5. Specifically, the end portion on the one side in the axial direction of the non-rotating side engaging portion 13 enters the portion on the one side in the circumferential direction of the rotating-side engaging groove portion 18.

When the driving member 5 is further rotated toward the one side in the circumferential direction, the nut 3 moves to the one side in the axial direction by the amount corresponding to the lead of the shaft-side ball thread groove 10. Therefore, while the non-rotating side engaging portion 13 increases the amount of entry in the axial direction into the rotating-side engaging groove portion 18 by moving toward the one side in the axial direction as indicated by the black arrows, the non-rotating side engaging portion 13 relatively moves inside the rotating-side engaging groove portion 18 toward the other side in the circumferential direction from the one side in the circumferential direction as indicated by the white arrows. As a result, the non-rotating side engaging portion 13 relatively moves inside the rotating-side engaging groove portion 18 to the other side in the circumferential direction in the order of A-B-C as in FIG. 8.

When the nut 3 reaches the stroke end on the one side in the axial direction, the non-rotating side engaging portion 13 engages with the rotating-side engaging groove portion 18 in the circumferential direction at the end portion on the other side in the circumferential direction of the rotating-side engaging groove portion 18. Specifically, as in the state illustrated as (C) in FIG. 8, the non-rotating side stopper surface 14 provided on the side surface on the other side in the circumferential direction of the non-rotating side engaging portion 13 and the rotating-side stopper surface 22 provided at end portion on the other side in the circumferential direction of the rotating-side engaging groove portion 18 engage in the circumferential direction. In this example, the non-rotating side stopper surface 14 and the rotating-side stopper surface 22 come into surface contact. As a result, the screw shaft 2 is prevented from rotating.

Further, when the driving member 5 is rotationally driven toward the other side in the circumferential direction from the state where the non-rotating side stopper surface 14 and the rotating-side stopper surface 22 are engaged in the circumferential direction, the non-rotating side engaging portion 13 relatively moves inside the rotating-side engaging groove portion 18 toward the one side in the circumferential direction and the other side in the axial direction in the order of C-B-A as in FIG. 8. Then, the non-rotating side engaging portion 13 moves from the end portion on the one side in the circumferential direction of the rotating-side engaging groove portion 18 to the outside of the rotating-side engaging groove portion 18 without contacting the stepped surface 23 of the rotating-side engaging groove portion 18.

As described above, with the ball screw device 1 of this example, the driving member 5 can be used to regulate the stroke end associated with the relative movement of the nut 3 to the screw shaft 2 toward the one side in the axial direction. The stroke end associated with the relative movement of the nut 3 to the other side in the axial direction with respect to the screw shaft 2 can be regulated using various conventionally known stroke limiting mechanisms.

With the ball screw device 1 of this example, regulation of the stroke end of the nut 3, which is a linear motion element, can be achieved with a small number of parts, and the ball screw device 1 can be more compact, and the controllability can be improved.

That is, in this example, the driving member 5 can not only rotationally drives the screw shaft 2, but also regulate the stroke end associated with the relative movement of the nut 3 to the one side in the axial direction with respect to the screw shaft 2. Therefore, unlike the conventional structure described in JP 2016-070281A, a dedicated component (stopper) for regulating the stroke end of the nut is not required to be used. Accordingly, with the ball screw device 1 of this example, the number of parts can be reduced. Further, since the dimension in the axial direction of the screw shaft 2 can be shortened by omitting a dedicated component for regulating the stroke end, the dimension in the axial direction of the ball screw device 1 can be shortened. As a result, it is possible to make the ball screw device 1 more compact.

In this example, in a state where the non-rotating side engaging portion 13 provided on the nut 3 is inserted inside the rotating-side engaging groove portion 18 provided in the driving member 5 in the axial direction, the non-rotating side stopper surface 14 of the non-rotating side engaging portion 13 and the rotating-side stopper surface 22 of the rotating-side engaging groove portion 18 can be engaged in the circumferential direction. As a result, it is possible to achieve both securing of the stroke amount of the nut 3 and miniaturization of the ball screw device 1.

In this example, in order to regulate the stroke end of the nut 3, the non-rotating side engaging portion 13 provided on the nut 3 and the rotating-side stopper surface 22 of the rotating-side engaging groove portion 18 provided in the driving member 5 are engaged in the circumferential direction. As a result, when the non-rotating side engaging portion 13 of the nut 3 and the rotating-side stopper surface 22 of the driving member 5 are engaged in the circumferential direction, the rotation of the driving member 5 can be immediately stopped. Therefore, it is possible to prevent the rotation stop position of the driving member 5 from deviating from the initial position. As a result, the axial position (stroke amount) of the nut 3 can be strictly controlled, and the controllability of the ball screw device 1 can be improved.

Further, since the rotating-side engaging groove portion 18 is a through groove that penetrates the base plate portion 15 in the axial direction, the weight of the driving member 5 can be reduced compared to the case where the rotating-side engaging groove portion is a bottomed groove.

Furthermore, since the torque input portion 17 provided on the outer-circumferential surface of the cylindrical portion 16 of the driving member 5 is arranged at a position overlapping the screw portion 8 in the radial direction, it is advantageous in terms of shortening the dimension in the axial direction of the ball screw device 1.

Figure 3:
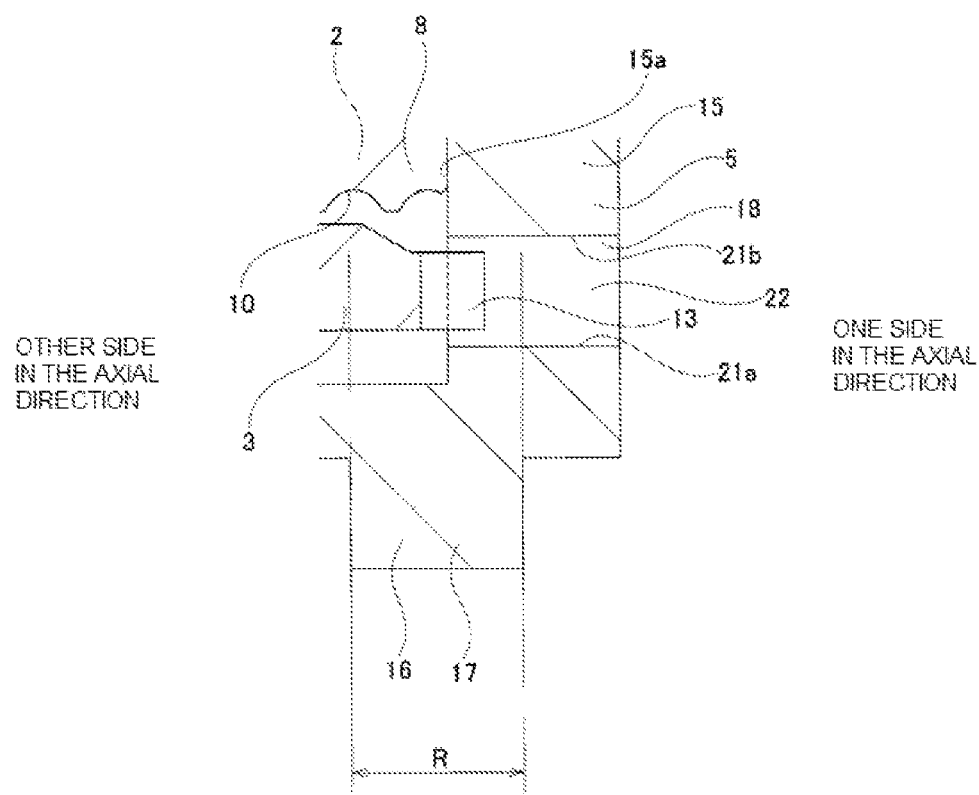
FIG. 3 is a partially enlarged view of FIG. 2.

In this example, the torque input portion 17 is arranged at a position radially overlapping the portion of the rotating-side stopper surface 22 on the other side in the axial direction that contacts the non-rotating side stopper surface 14. In other words, as illustrated in FIG. 3, the portion of the rotating-side stopper surface 22 on the other side in the axial direction that contacts the non-rotating side stopper surface 14 exists in the range R where the torque input portion 17 exists in the axial direction. Therefore, also from this aspect, the dimension in the axial direction of the ball screw device 1 can be shortened. Further, it is possible to prevent a moment load based on an impact load caused by collision between the non-rotating side stopper surface 14 and the rotating-side stopper surface 22 from being applied from the torque input portion 17 to the driving source side.

Second Example

Figure 9:
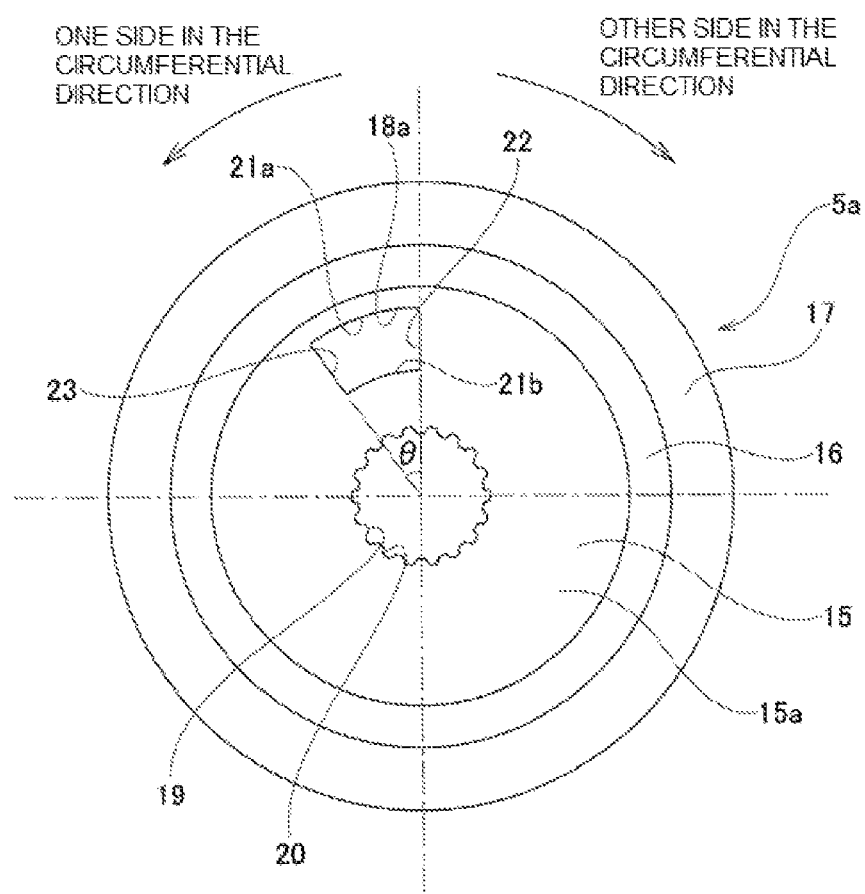
FIG. 9 is a front view of a driving member of a ball screw device according to a second example of an embodiment of the present invention, as viewed from the other side in the axial direction.
Figure 10:
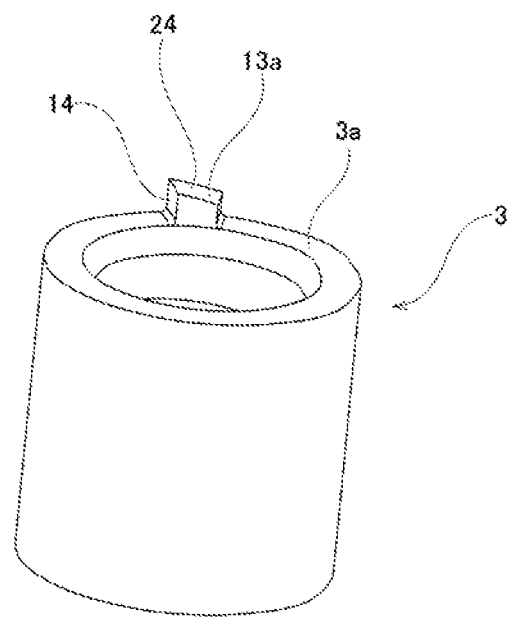
FIG. 10 is a perspective view of a nut of the ball screw device according to the second example, as viewed from the one side in the axial direction and from the outside in the radial direction.

A second example of an embodiment of the present invention will be described with reference to FIG. 9 to FIG. 11.

In the case of this example, the center angle θ of the rotating-side engaging groove portion 18a of the driving member 5a is made smaller than in the construction of the first example. Specifically, the center angle θ of the rotating-side engaging groove portion 18a is set to the lower limit of 36 degrees.

Further, in order to secure the size of the engagement allowance δ between the non-rotating side stopper surface 14 and the rotating-side stopper surface 22 to be 1/10 (10%) of the lead of the shaft-side ball thread groove 10 even when the center angle θ of the rotating-side engaging groove portion 18a is set to 36 degrees, the shape of the tip-end surface (end surface on the one side in the axial direction) of the non-rotating side engaging portion 13a is devised.

That is, a flat inclined surface (chamfer) 24 inclined with respect to a virtual plane perpendicular to the center axis of the nut 3 is formed on the tip-end surface of the non-rotating side engaging portion 13a. Specifically, the inclined surface 24 is formed on the entire tip-end surface of the non-rotating side engaging portion 13a so as to be inclined in a direction that retreats toward the other side in the axial direction toward the one side in the circumferential direction. The inclination angle of the inclined surface 24 can be set to be equal to or larger than the lead angle β of the shaft-side ball thread groove 10, and in the illustrated example, the angle is slightly larger than the lead angle β of the shaft-side ball thread groove 10.

Figure 11:
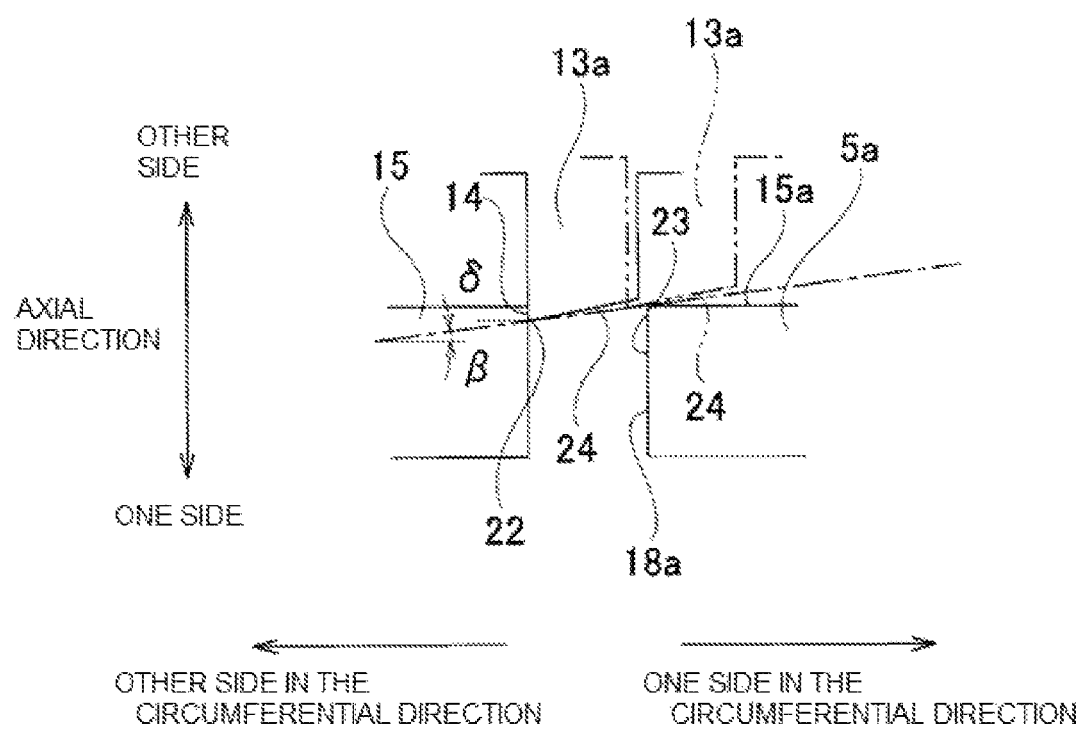
FIG. 11 is a view corresponding to FIG. 8, illustrating a ball screw device of the second example.

In the case of this example as well, when the nut 3 moves to the one side in the axial direction relative to the screw shaft 2 and approaches the stroke end, as indicated by the chain line in FIG. 11, the end portion on the one side in the axial direction (tip end portion) of the non-rotating side engaging portion 13a enters the inside of the rotating-side engaging groove portion 18a. Specifically, the end portion on the one side in the axial direction of the non-rotating side engaging portion 13a enters the portion on the one side in the circumferential direction of the rotating-side engaging groove portion 18a. In this example, since the inclined surface 24 is formed on the tip-end surface of the non-rotating side engaging portion 13a, the end portion on the other side in the circumferential direction of the end portion on the one side in the axial direction of the non-rotating side engaging portion 13a enters the portion on the one side in the circumferential direction of the rotating-side engaging groove portion 18a without the tip-end surface of the non-rotating side engaging portion 13a and the side surface 15a on the other side in the axial direction of the base plate portion 15 interference with each other.

When the driving member 5a is further rotated toward the one side in the circumferential direction, the non-rotating side engaging portion 13a relatively moves inside of the rotating-side engaging groove portion 18a from the one side in the circumferential direction to the other side in the circumferential direction while increasing the amount of entry in the axial direction into the rotating-side engaging groove portion 18a.

When the nut 3 reaches the stroke end on the one side in the axial direction, the non-rotating side engaging portion 13a engages with the rotating-side engaging groove portion 18a in the circumferential direction at the end portion on the other side in the circumferential direction of the rotating-side engaging groove portion 18a. Specifically, as indicated by the solid line in FIG. 11, the non-rotating side stopper surface 14 provided on the side surface on the other side in the circumferential direction of the non-rotating side engaging portion 13a and the rotating-side stopper surface 22 provided at the end portion on the other side in the circumferential direction of the rotating-side engaging groove portion 18a engage in the circumferential direction. Due to this, the screw shaft 2 is prevented from rotating.

In this example, when the non-rotating side stopper surface 14 and the rotating-side stopper surface 22 are engaged in the circumferential direction, the size of the engagement allowance δ is ⅒ of the lead of the shaft-side ball thread groove 10.

Further, in the case of this example, since the center angle θ of the rotating-side engaging groove portion 18a is smaller than that of the construction of the first example, the amount of rotation of the driving member 5a, from which the end portion on the one side in the axial direction of the non-rotating side engaging portion 13a enters inside the rotating-side engaging groove portion 18a to the point where the non-rotating side stopper surface 14 and the rotating-side stopper surface 22 are engaged in the circumferential direction, is smaller than that of the construction of the first example.

In this example, by forming the inclined surface 24 on the tip-end surface of the non-rotating side engaging portion 13a, it is possible to prevent the tip-end surface of the non-rotating side engaging portion 13a from interfering with the side surface 15a on the other side in the axial direction of the base plate portion 15. Therefore, even when the center angle θ of the rotating-side engaging groove portion 18a is set to 36 degrees, the size of the engagement allowance δ can be secured by ⅒ of the lead of the shaft-side ball thread groove 10. Accordingly, the reduction in strength of the driving member 5a caused by forming the rotating-side engaging groove portion 18a can be suppressed, and the rotation of the screw shaft 2 can be prevented. Here, in a case of implementing the present invention, the inclined surface formed on the tip-end surface of the non-rotating side engaging portion is not limited to a flat surface, and may be configured to be a convex curved surface or a concave curved surface.

Other Configurations and operational effects of the second example are the same as in the first example.

Third Example

Figure 12:
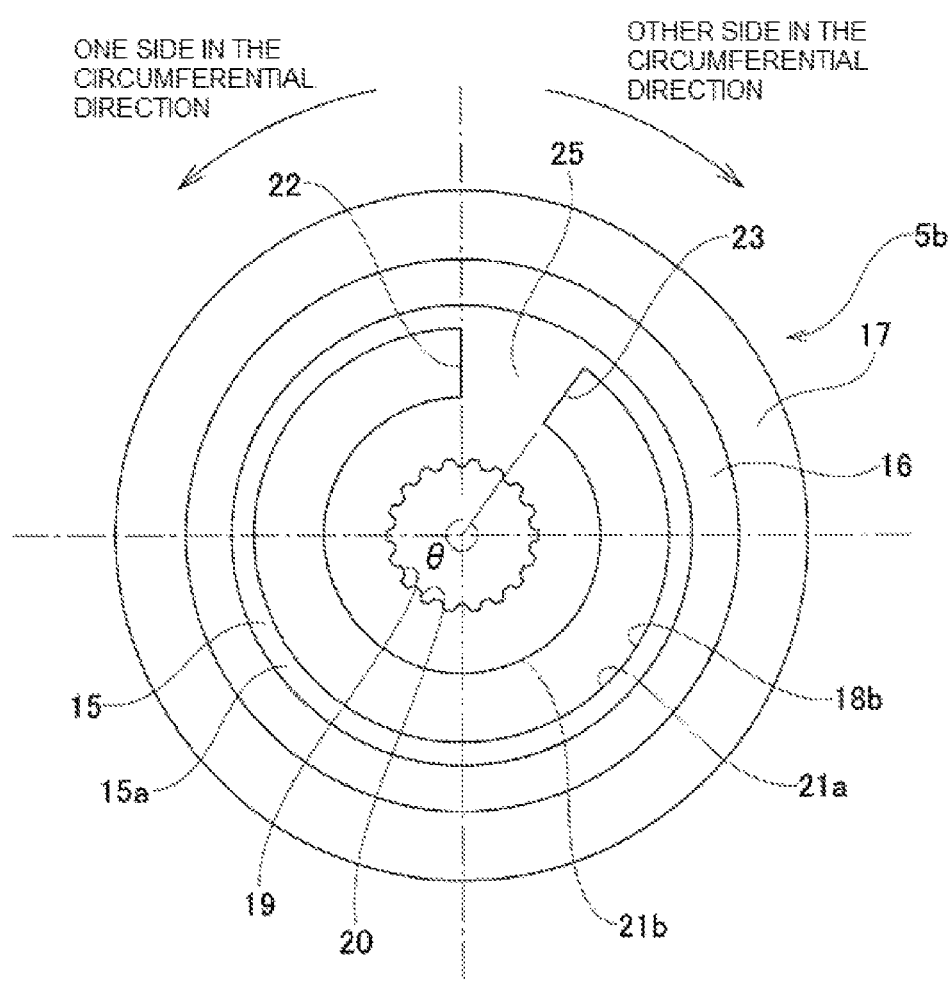
FIG. 12 is a front view of a driving member of a ball screw device according to a third example of an embodiment of the present invention, as viewed from the other side in the axial direction.

A third example of an embodiment of the present invention will be described with reference to FIG. 12 to FIG. 13.

In the case of this example, the center angle θ of the rotating-side engaging groove portion 18b of the driving member 5b is made larger than that of the construction of the first example. Specifically, the center angle θ of the rotating-side engaging groove portion 18b is set to the upper limit of 324 degrees.

Therefore, of the base plate portion 15, the portion that exists on radially inward of the rotating-side engaging groove portion 18b and the portion that exists on radially outward of the rotating-side engaging groove portion 18b are connected through a connecting portion 25 with a center angle of 36 degrees located at a discontinuous portion of the rotating-side engaging groove portion 18b.

In this example, in order to ensure the size of the engagement allowance δ to be 9/10 (90%) of the lead of the shaft-side ball thread groove 10 and to ensure the size of the clearance C in the axial direction between the side surface 3a on the one side in the axial direction of the nut 3 and the side surface 15a on the other side in the axial direction of the base plate portion 15 to be 1/10 (10%) or more of the lead of the shaft-side ball thread groove 10, the center angle θ of the rotating-side engaging groove portion 18b is set to 324 degrees, the dimension in the axial direction of the non-rotating side engaging portion 13b is set to be the same as the lead of the shaft-side ball thread groove 10, and a flat inclined surface 24 inclined with respect to a virtual plane perpendicular to the center axis of the nut 3 is formed on the tip-end surface of the non-rotating side engaging portion 13b. Specifically, similar to the construction of the second example, the inclined surface 24 is formed on the entire tip-end surface of the non-rotating side engaging portion 13b so as to be inclined in a direction that retreats toward the other side in the axial direction toward the one side in the circumferential direction. The inclination angle of the inclined surface 24 can be set to be equal to or larger than the lead angle β of the shaft-side ball thread groove 10, and in the illustrated example, the angle is slightly larger than the lead angle β of the shaft-side ball thread groove 10.

Figure 13:
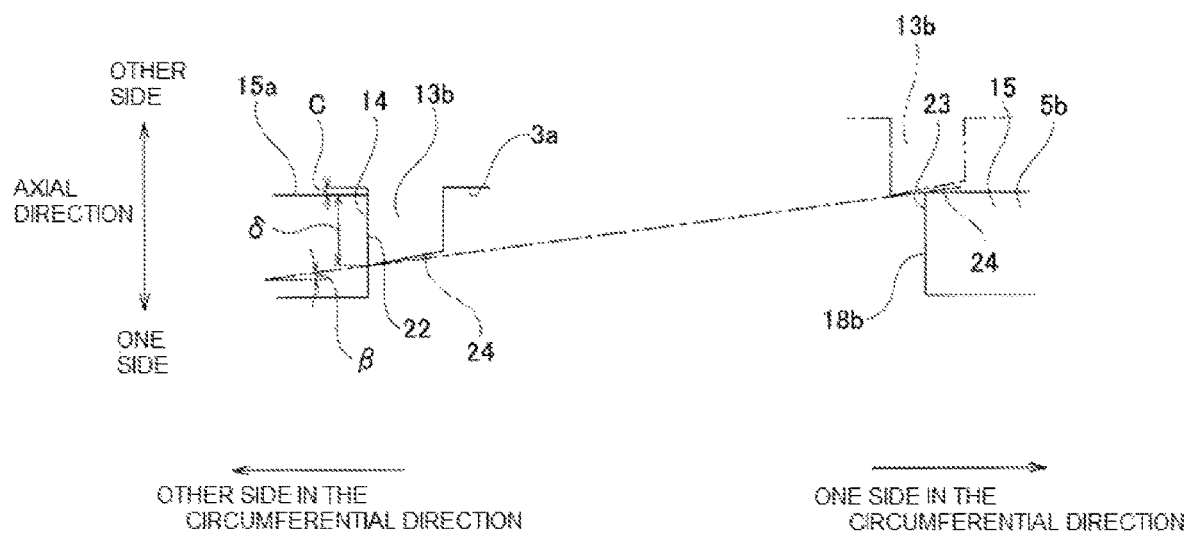
FIG. 13 is a view corresponding to FIG. 8, and illustrates the ball screw device of the third example.

In the case of this example as well, when the nut 3 moves to the one side in the axial direction relative to the screw shaft 2 and approaches the stroke end, as indicated by the chain line in FIG. 13, the end portion on the one side in the axial direction (tip end portion) of the non-rotating side engaging portion 13b enters the inside of the rotating-side engaging groove portion 18b. Specifically, the end portion on the one side in the axial direction of the non-rotating side engaging portion 13b enters the portion on the one side in the circumferential direction of the rotating-side engaging groove portion 18b. In this example, since the inclined surface 24 is formed on the tip-end surface of the non-rotating side engaging portion 13b, the end portion on the other side in the circumferential direction of the end portion on the one side in the axial direction of the non-rotating side engaging portion 13b enters the portion on the one side in the circumferential direction of the rotating-side engaging groove portion 18b without the tip-end surface of the non-rotating side engaging portion 13b and the side surface 15a on the other side in the axial direction of the base plate portion 15 interference with each other.

When the driving member 5b is further rotated toward the one side in the circumferential direction, the non-rotating side engaging portion 13b relatively moves inside of the rotating-side engaging groove portion 18b from the one side in the circumferential direction to the other side in the circumferential direction while increasing the amount of entry in the axial direction into the rotating-side engaging groove portion 18b.

When the nut 3 reaches the stroke end on the one side in the axial direction, the non-rotating side engaging portion 13b engages with the rotating-side engaging groove portion 18b in the circumferential direction at the end portion on the other side in the circumferential direction of the rotating-side engaging groove portion 18b. Specifically, as indicated by the solid line in FIG. 13, the non-rotating side stopper surface 14 provided on the side surface on the other side in the circumferential direction of the non-rotating side engaging portion 13b and the rotating-side stopper surface 22 provided at the end portion on the other side in the circumferential direction of the rotating-side engaging groove portion 18b engage in the circumferential direction. Due to this, the screw shaft 2 is prevented from rotating.

In this example, when the non-rotating side stopper surface 14 and the rotating-side stopper surface 22 are engaged in the circumferential direction, the size of the engagement allowance δ is 9/10 of the lead of the shaft-side ball thread groove 10. Further, in the case of this example, since the center angle θ of the rotating-side engaging groove portion 18b is larger than that of the construction of the first example, the amount of rotation of the driving member 5a, from which the end portion on the one side in the axial direction of the non-rotating side engaging portion 13b enters inside the rotating-side engaging groove portion 18b to the point where the non-rotating side stopper surface 14 and the rotating-side stopper surface 22 are engaged in the circumferential direction, is larger than that of the construction of the first example.

In the case of this example, since the size of the engagement allowance δ can be ensured to be 9/10 of the lead of the shaft-side ball thread groove 10, the rotation of the screw shaft 2 can be effectively prevented. Further, since the size of the clearance C in the axial direction between the nut 3 and the driving member 5b can be ensured to be 1/10 of the lead of the shaft-side ball thread groove 10, interference between the nut 3 and the driving member 5b can be prevented. Furthermore, the stroke amount of the nut 3 can also be ensured.

Other Configurations and operational effects of the third example are the same as in the first example.

Fourth Example

Figure 14:
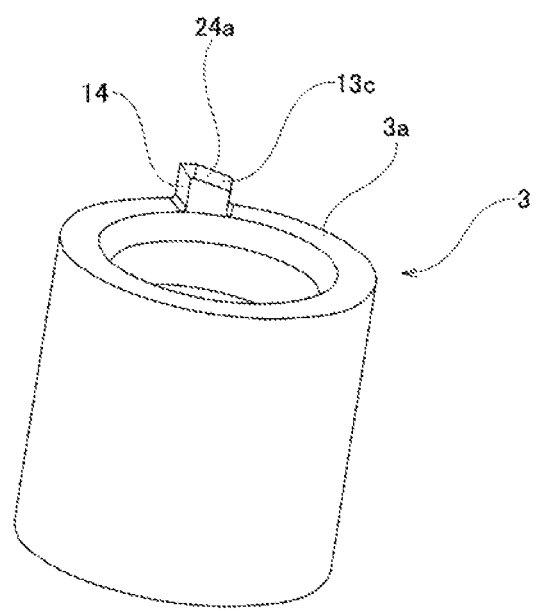
FIG. 14 is a perspective view of a nut of a ball screw device according to a fourth example of an embodiment of the present invention, as viewed from the one side in the axial direction and outside in the radial direction.

A fourth example of an embodiment of the present invention will be described with reference to FIG. 14.

In this example, an inclined surface 24a is formed in a range extending from the intermediate portion in the circumferential direction to the end portion on the one side in the circumferential direction, excluding the end portion on the other side in the circumferential direction, of the tip-end surface of the non-rotating side engaging portion 13c. Therefore, of the tip-end surface of the non-rotating side engaging portion 13c, the end portion on the other side in the circumferential direction exists on a virtual plane perpendicular to the center axis of the nut 3. The inclination angle of the inclined surface 24a can be set to be equal to or greater than the lead angle β of the shaft-side ball thread groove 10.

Figure 2:
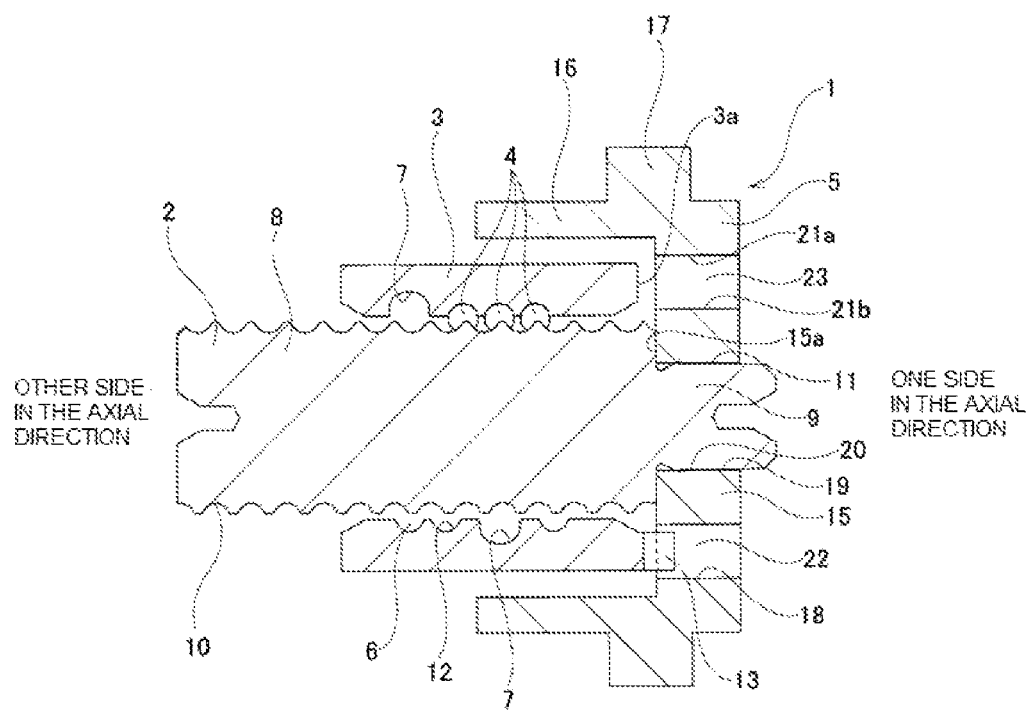
FIG. 2 is a cross-sectional view of section A-A in FIG. 1, illustrating a state in which the stroke end of the nut is regulated in the ball screw device of the first example.

In the case of this example, compared to the construction of the first example in which the tip-end surface of the rotating-side engaging portion is a flat surface existing on a virtual plane perpendicular to the center axis of the nut, it is advantageous in securing the size of the engagement allowance δ while preventing interference with the driving member 5 (see FIG. 2, etc.).

Other Configurations and operational effects of the fourth example are the same as in the first example.

Fifth Example

Figure 15:
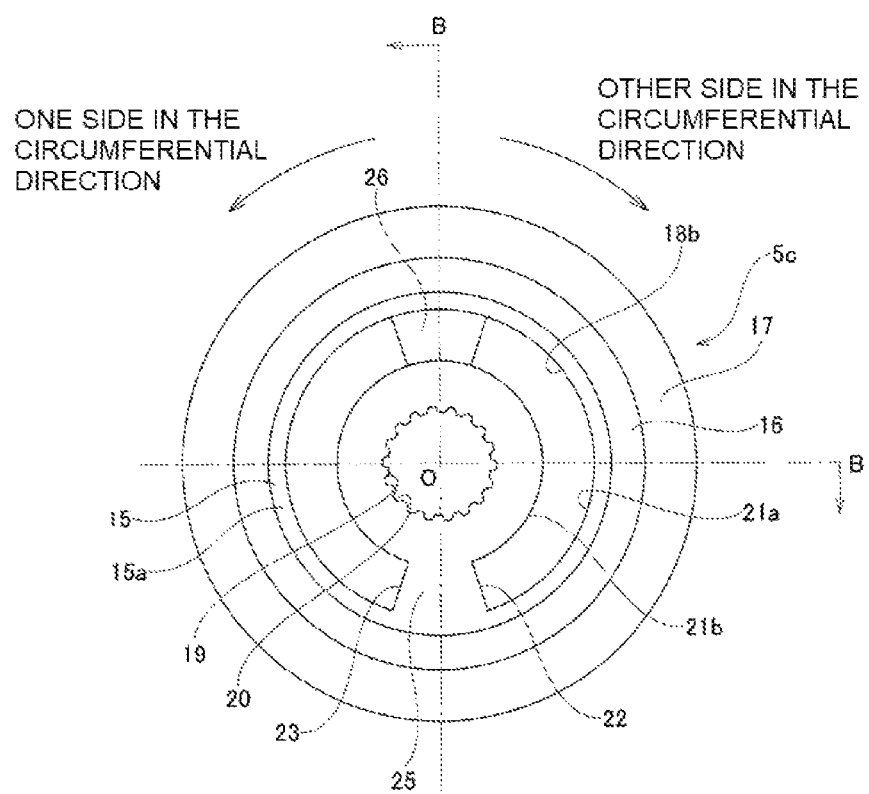
FIG. 15 is a front view of a driving member of a ball screw device according to a fifth example of an embodiment of the present invention, as viewed from the other side in the axial direction.
Figure 16:
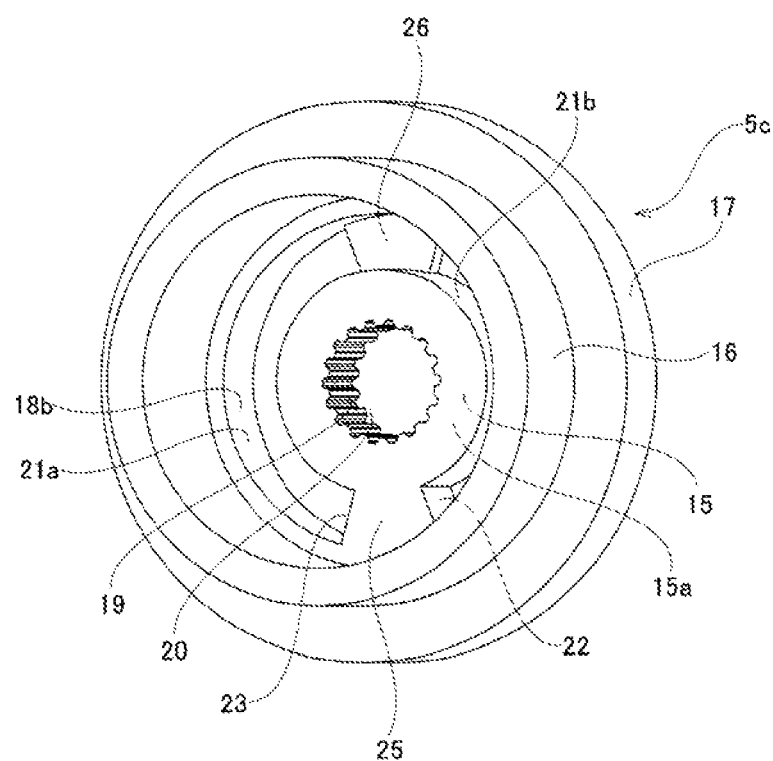
FIG. 16 is a perspective view of the driving member illustrated in FIG. 15.
Figure 17:
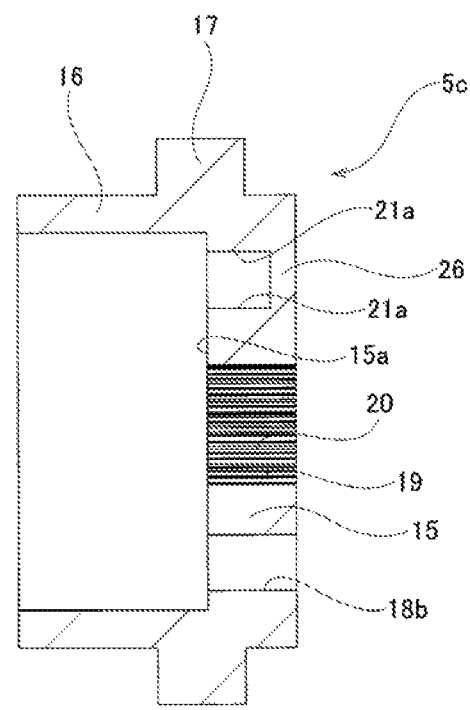
FIG. 17 is a cross-sectional view of section B-O-B in FIG. 15.

A fifth example of an embodiment of the present invention will be described with reference to FIG. 15 to FIG. 17.

This example is a modification of the third example. The driving member 5c of this example has one reinforcing portion 26 in the intermediate portion in the circumferential direction (center portion in the illustrated example) of the rotating-side engaging groove portion 18b, provided for connecting the inner-side surface 21a on the outer-side in the radial direction and the inner-side surface 21b on the inner-side in the radial direction. The reinforcing portion 26 connects the end portion on the one side in the axial direction of the inner-side surface 21a on the outer-side in the radial direction and the end portion on the one side in the axial direction of the inner-side surface 21b on the inner-side in the radial direction. The reinforcing portion 26 has a sector shape when viewed in the axial direction.

The position in the circumferential direction and the thickness dimension of the reinforcing portion 26 are regulated to a position and thickness that can prevent interference with the non-rotating side engaging portion 13 entering the inside of the rotating-side engaging groove portion 18b. In the illustrated example, the thickness dimension of the reinforcing portion 26 is about ¼ of the thickness dimension of the base plate portion 15. In a case of implementing the present invention, it is also possible to provide reinforcing portions at a plurality of locations in the circumferential direction of the rotating-side engaging groove portion.

In this example, the reinforcing portion 26 is configured integrally with the base plate portion 15. However, in a case of implementing the present invention, the reinforcing portion can also be configured separately from the base plate portion and fixed to the base plate portion. For example, the end portion on the outer-side in the radial direction and the end portion on the inner-side in the radial direction of the reinforcing portion can be fixed to the inner-side surface on the outer-side in the radial direction and the inner-side surface on the inner-side in the radial direction of the of the rotating-side engaging groove portion by adhesion or welding.

In this example, of the base plate portion 15, the portion existing on the inner-side in the radial direction of the rotating-side engaging groove portion 18b and the portion existing on the outer-side in the radial direction of the rotating-side engaging groove portion 18b are connected not only by the connecting portion 25, but also by the reinforcing portion 26. Therefore, it is possible to improve the rigidity of the portion of the base plate portion 15 surrounding the mounting hole 19, which is located on the inner-side in the radial direction of the rotating-side engaging groove portion 18b. Accordingly, the (torsional rigidity) of the female spline teeth 20 formed on the inner-circumferential surface of the mounting hole 19 can be secured even when the center angle θ of the rotating-side engaging groove portion 18b formed on the base plate portion 15 is large. As a result, a larger torque can be transmitted to the screw shaft 2 by the driving member 5c.

Other Configurations and operational effects of the fifth example are the same as in the first example and the third example.

Sixth Example

Figure 18:
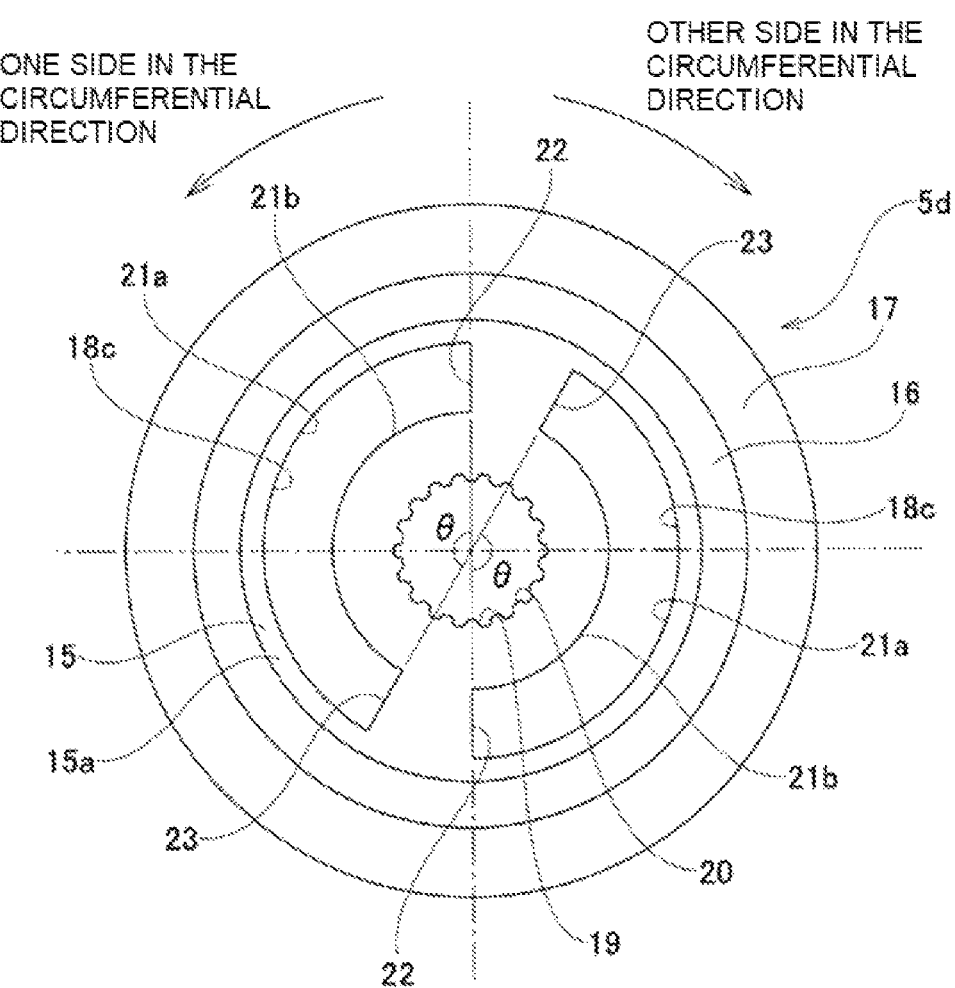
FIG. 18 is a front view of a driving member of a ball screw device according to a sixth example of an embodiment of the present invention, as viewed from the other side in the axial direction.
Figure 19:
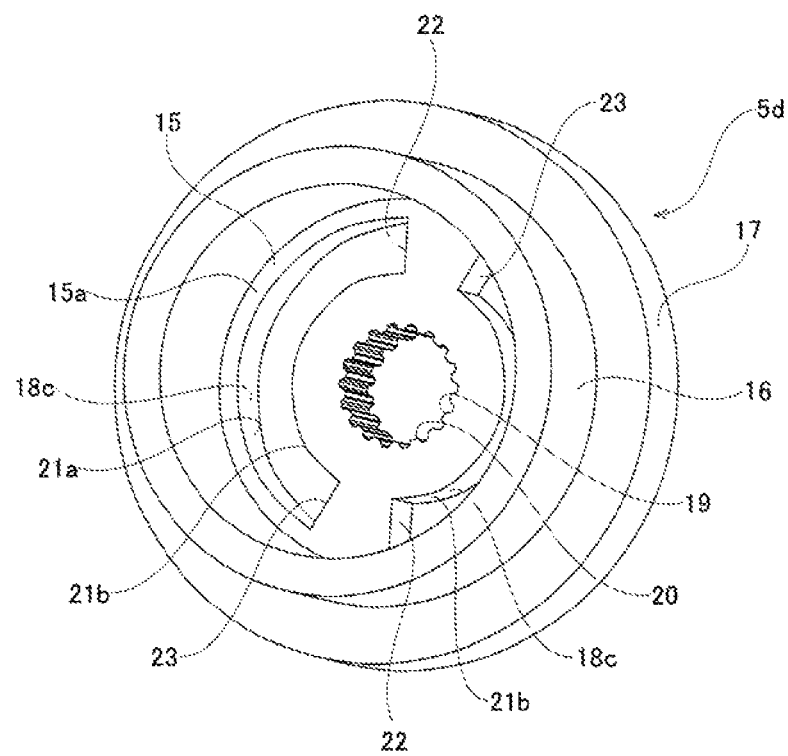
FIG. 19 is a perspective view of the driving member illustrated in FIG. 18.

A sixth example of an embodiment of the present invention will be described with reference to FIG. 18 to FIG. 19.

Unlike the constructions of the first example to the fifth example, the driving member 5d of this example has two rotating-side engaging groove portions 18c formed on the base plate portion 15. In this example, the size of the center angle θ of the two rotating-side engaging groove portions 18c is set to 150 degrees respectively. Further, the two rotating-side engaging groove portions 18c are arranged so as to be evenly spaced in the circumferential direction of the driving member 5d. Therefore, the center angles of the portions existing between the two rotating-side engaging groove portions 18c are the same with each other (30 degrees). Further, the inner-side surfaces 21a on the outer-side in the radial direction and the inner-side surfaces 21b of the two rotating-side engaging groove portions 18c have the same diameter. However, in a case of implementing the present invention, the center angles of the plurality of rotating-side engaging groove portions can be made different from each other, and the diameters of the inner-side surfaces on the outer-side in the radial direction and the inner-side surfaces on the inner-side in the radial direction can also be made different from each other.

Each of the two rotating-side engaging groove portions 18c has a rotating-side stopper surface 22 at the end portion on the other side in the circumferential direction. In the illustrated example, the two rotating-side stopper surface 22 exist on the same virtual plane including the center axis of the driving member 5d.

In the case of this example, the driving member 5d as described above is used in combination with the nut 3 having only one non-rotating side engaging portion 13 (13a to 13c) as in the constructions of the first example to the fifth example (see FIG. 5, etc.).

In this example, since the driving member 5d is provided with two rotating-side engaging groove portions 18c, phase matching between any one of rotating-side engaging groove portions 18c and the non-rotating side engaging portion 13 is achieved during assembly of the ball screw device 1. Therefore, compared to a structure with only one rotating-side engaging groove portion, it is possible to facilitate the assembly work. Further, since the two rotating-side engaging groove portions 18c are arranged so as to be evenly spaced in the circumferential direction of the driving member 5d, the rotation balance of the driving member 5d can be improved.

As a modification of this example, the driving member 5d provided with two rotating-side engaging groove portions 18c can be used in combination with a nut provided with the same number of non-rotating side engaging portions as the rotating-side engaging groove portions 18c. In this case, the stroke end of the nut is regulated by simultaneously engaging the two rotating-side engaging groove portions 18c and the two non-rotating side engaging portions in the circumferential direction. Therefore, it is possible to reduce the force acting on each of the rotating-side engaging groove portions 18c, and effectively prevent damage to the driving member 5d.

Other Configurations and operational effects of the sixth example are the same as in the first example.

Seventh Example

Figure 20:
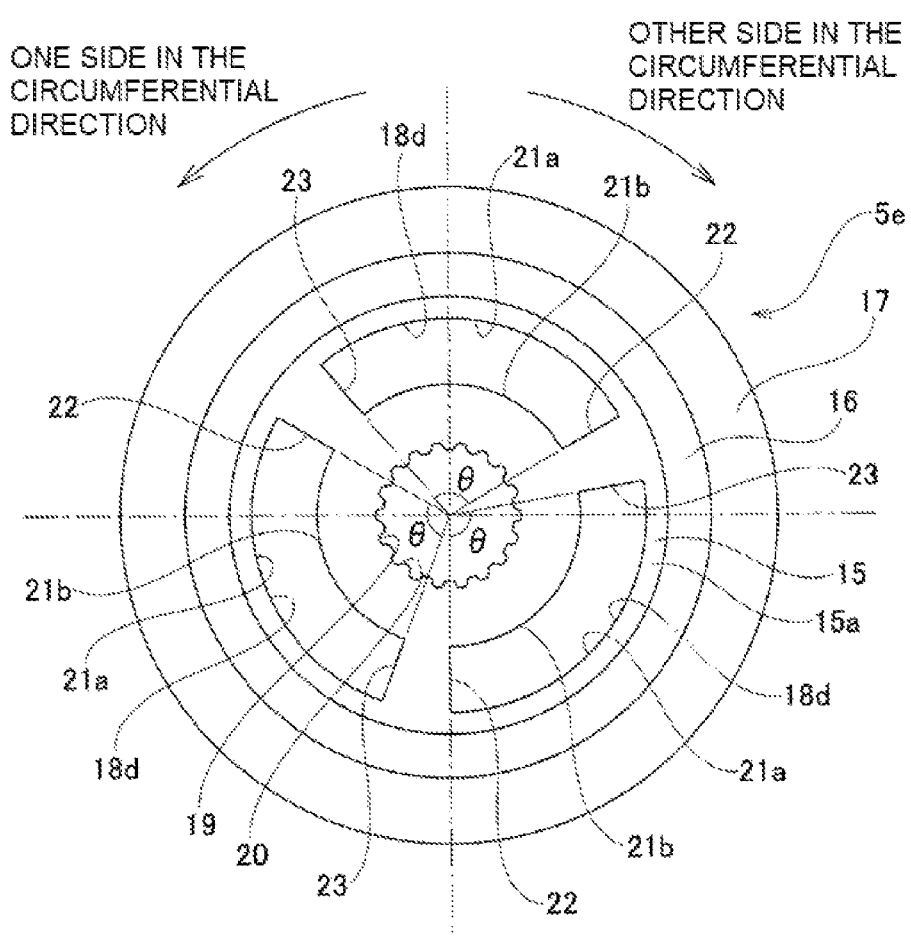
FIG. 20 is a front view of a driving member of a ball screw device according to a seventh example of an embodiment of the present invention, as viewed from the other side in the axial direction.
Figure 21:
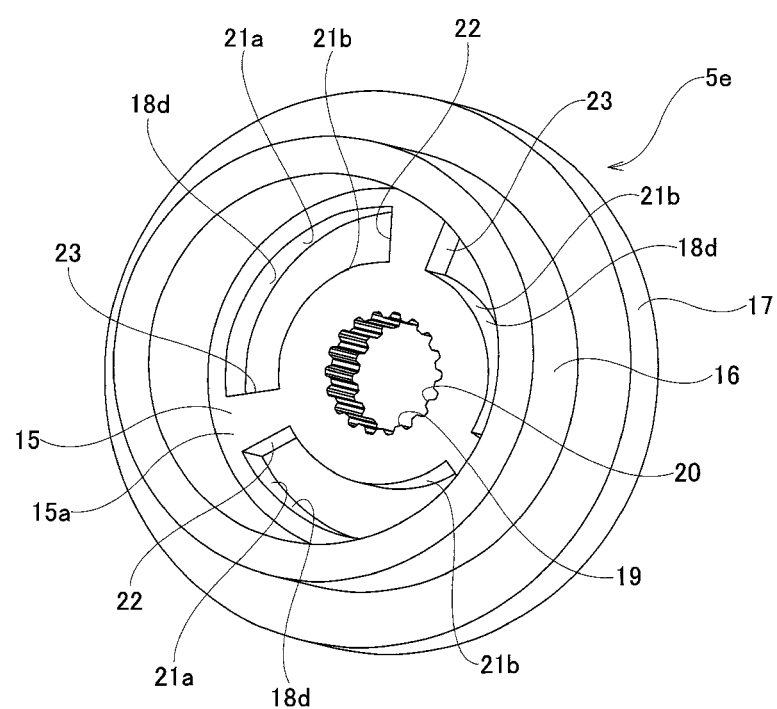
FIG. 21 is a perspective view of the driving member illustrated in FIG. 20.

A seventh example of an embodiment of the present invention will be described with reference to FIG. 20 to FIG. 21.

In the driving member 5e of this example, the base plate portion 15 is formed with three rotating-side engaging groove portions 18d. In this example, the size of the center angle θ of each of the three rotating-side engaging groove portions 18d is 95 degrees. Further, the three rotating-side engaging groove portions 18d are arranged so as to be evenly spaced in the circumferential direction of the driving member 5e. Due to this, the size of the center angle of the each of the portions existing between two rotating-side engaging groove portions 18d adjacent in the circumferential direction is the same (25 degrees). Further, the diameters of the inner-side surfaces 21a on the outer-side in the radial direction and the inner-side surfaces 21b on the inner-side in the radial direction of the three rotating-side engaging groove portions 18d are the same.

Each of the three rotating-side engaging groove portions 18d has a rotating-side stopper surface 22 at the end portion on the other side in the circumferential direction.

In the case of this example as well, compared to a structure with only one rotating-side engaging groove portion, it is possible to facilitate the assembly work. Further, since the three rotating-side engaging groove portions 18d are arranged so as to be evenly spaced in the circumferential direction of the driving member 5e, the rotation balance of the driving member 5e can be improved.

As in the sixth example, the driving member 5e of this example can be used in combination with a nut 3 having only one non-rotating side engaging portion 13 (13a to 13c), or can also be used in combination with a nut provided with the same number of non-rotating side engaging portions as the rotating-side engaging groove portions 18.

Other Configurations and operational effects of the seventh example are the same as in the first example and the sixth example.

Eighth Example

Figure 22:
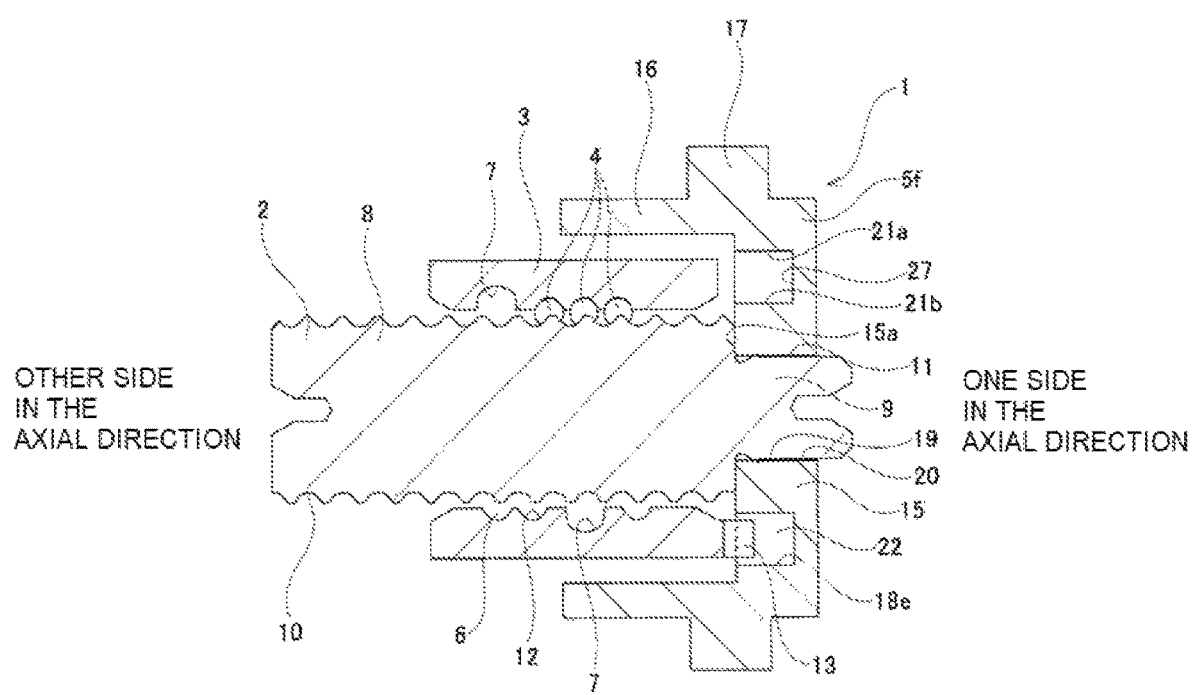
FIG. 22 is a view corresponding to FIG. 2, and illustrates a ball screw device according to an eighth example of an embodiment of the present invention.
Figure 23:
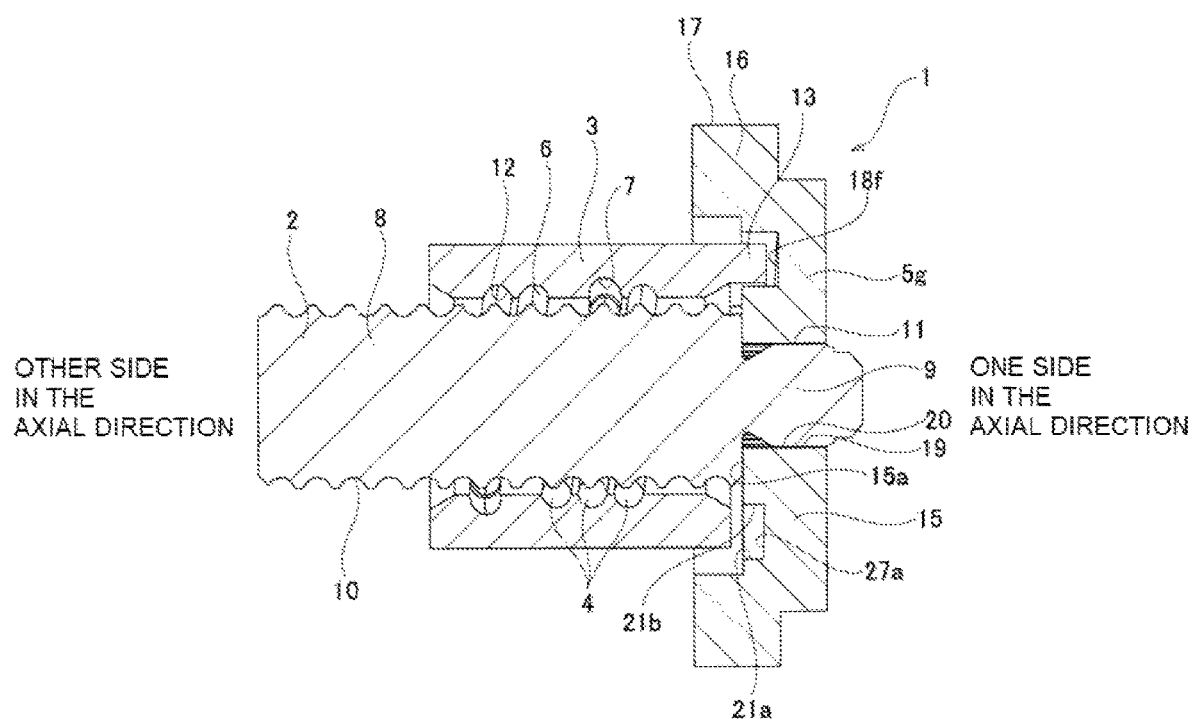
FIG. 23 is a view corresponding to FIG. 2, and illustrates a ball screw device according to a ninth example of an embodiment of the present invention.
Figure 24:
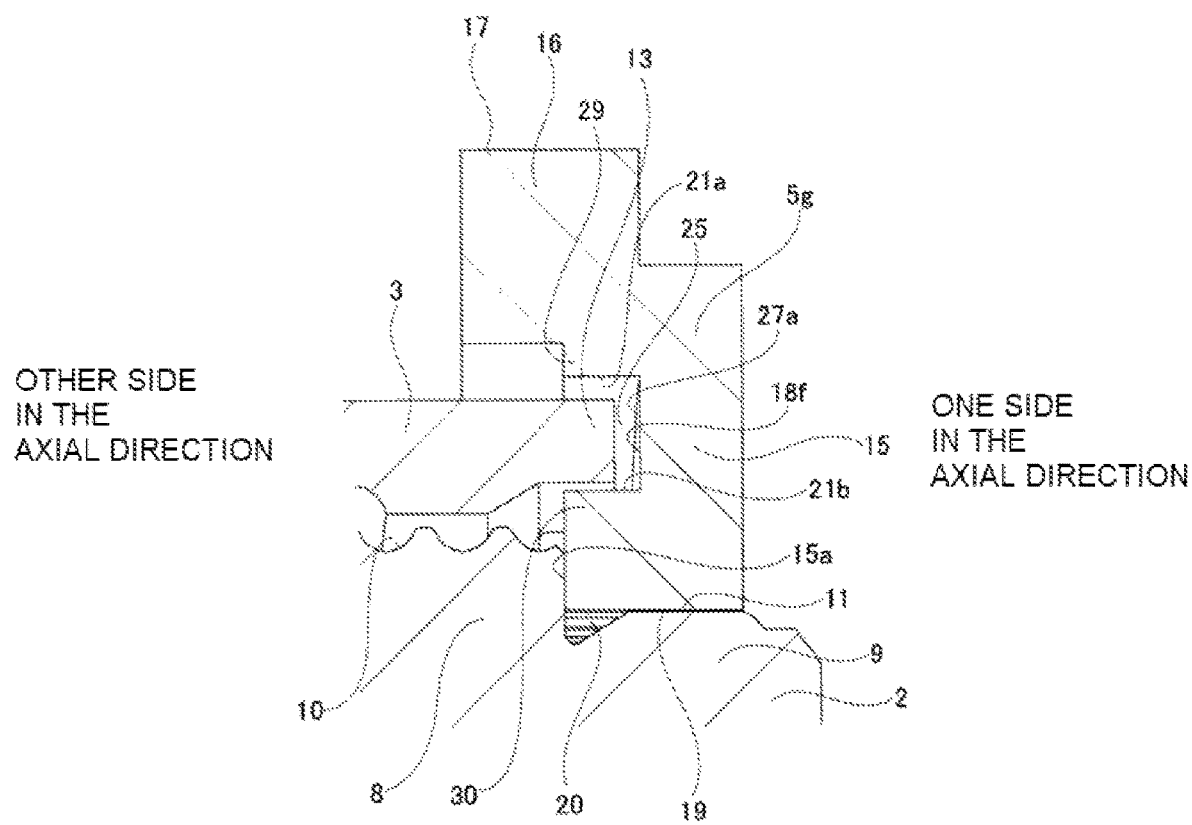
FIG. 24 is a partially enlarged view of FIG. 23.

An eighth example of an embodiment of the present invention will be described with reference to FIG. 22.

In this example, unlike the first example to the seventh example, the rotating-side engaging groove portion 18e of the driving member 5f is a bottomed groove (concave groove) that is open to the side surface 15a on the other side in the axial direction of the base plate portion 15 and has a depth (groove depth) in the axial direction that is constant along the circumferential direction. Therefore, the groove bottom surface 27 of the rotating-side engaging groove portion 18e exists on a virtual plane perpendicular to the center axis of the driving member 5f.

The dimension in the axial direction of the rotating-side stopper surface 22, which corresponds to the depth in the axial direction of the rotating-side engaging groove portion 18e, is set to a size that can ensure a sufficient engagement allowance δ to prevent the rotation of the screw shaft 2 between the non-rotating side stopper surface 14 of the non-rotating side engaging portion 13. In this example, the dimension in the axial direction of the rotating-side stopper surface 22 is larger than the dimension in the axial direction of the non-rotating side engaging portion 13 (non-rotating side stopper surface 14).

In this example, since the rotating-side engaging groove portion 18e is a bottomed groove, compared to the case where the rotating-side engaging groove portion is a through groove, it is possible to suppress the reduction in strength of the driving member 5 due to the formation of the rotating-side engaging groove portion.

In this example, the rotating-side engaging groove portion 18e is formed in the intermediate portion in the radial direction of the side surface 15a on the other side in the axial direction of the base plate portion 15. Therefore, an outer diameter-side cylindrical portion 29 having a partially cylindrical shape, which protrudes more to the other side in the axial direction than the groove bottom surface 27 of the rotating-side engaging groove portion 18e, is formed in a portion on the outer-side in the radial direction of the rotating-side engaging groove portion 18e of the base plate portion 15. Further, an inner diameter-side cylindrical portion 30 having a partially cylindrical shape, which protrudes more to the other side in the axial direction than the groove bottom surface 27 of the rotating-side engaging groove portion 18e, is formed in a portion on the inner-side portion in the radial direction of the rotating-side engaging groove portion 18e of the base plate portion 15. Furthermore, in this example, the rotating-side stopper surface 22 is connected to each of the outer diameter-side cylindrical portion 29 and the inner diameter-side cylindrical portion 30. Therefore, the rigidity of the rotating-side stopper surface 22 can be improved. Here, in a case of implementing the present invention, the rigidity of the rotating-side stopper surface can be improved by connecting the rotating-side stopper surface to at least one of the outer diameter-side cylindrical portion and the inner diameter-side cylindrical portion.

Other Configurations and operational effects of the eighth example are the same as in the first example.

Ninth Example

A ninth example of an embodiment of the present invention will be described with reference to FIG. 23 to FIG. 28.

In this example, unlike the first example to the eighth example, the rotating-side engaging groove portion 18f of the driving member 5g is a bottomed groove (concave groove) that is open to the side surface 15a on the other side in the axial direction of the base plate portion 15 and has a depth (groove depth) in the axial direction that changes along the circumferential direction.

Specifically, the depth in the axial direction of the rotating-side engaging groove portion 18f becomes larger (deeper) from the one side in the circumferential direction toward the other side in the circumferential direction. Due to this, the groove bottom surface 27a of the rotating-side engaging groove portion 18f is inclined with respect to a virtual plane perpendicular to the center axis of the driving member 5g. In this example, the groove bottom surface 27a is inclined by the same angle $\alpha 1$ as the lead angle $\beta 1$ of the shaft-side ball thread groove 10 (and the nut-side ball thread groove 12) in a direction toward the one side in the axial direction toward the other side in the circumferential direction with respect to a virtual plane perpendicular to the center axis of the driving member 5g ($\alpha 1 = \beta 1$).

The rotating-side engaging groove portion 18f has a width dimension in the radial direction that allows the non-rotating side engaging portion 13 provided on the nut 3 to be inserted in the axial direction. Therefore, the inner-side surface 21a on the outer-side in the radial direction of the rotating-side engaging groove portion 18f has an inner diameter slightly larger than the diameter of a circumscribed circle passing through the outer-circumferential surface of the non-rotating side engaging portion 13. Further, the inner-side surface 21b on the inner-side in the radial direction of the rotating-side engaging groove portion 18f has an outer diameter slightly smaller than the diameter of an inscribed circle passing through the inner-circumferential surface of the non-rotating side engaging portion 13. The inner-side surface 21a on the outer-side in the radial direction and the inner-side surface 21b on the inner-side in the radial direction of the rotating-side engaging groove portion 18f are arranged on a concentric circle.

The rotating-side engaging groove portion 18f has a flat rotating-side stopper surface 22 facing in the circumferential direction at the end portion on the other side in the circumferential direction where the depth in the axial direction is the largest. Therefore, the end portion on the other side in the circumferential direction of the groove bottom surface 27a of the rotating-side engaging groove portion 18f is connected to the side surface 15a on the other side in the axial direction of the base plate portion 15 through the rotating-side stopper surface 22. The rotating-side stopper surface 22 comes into surface contact with the non-rotating side stopper surface 14 when the nut 3 has moved to the one side in the axial direction relative to the screw shaft 2 and reached the stroke end. For this reason, the rotating-side stopper surface 22 is arranged substantially parallel to the center axis of the driving member 5g. The dimension in the axial direction of the rotating-side stopper surface 22 is set to a size that ensures sufficient engagement allowance $\delta$ (width in the axial direction of the contact portion with the non-rotating side stopper surface 14) to prevent the rotation of the screw shaft 2 between the non-rotating side stopper surface 14 of the non-rotating side engaging portion 13. In this example, the dimension in the axial direction of the rotating-side stopper surface 22 is substantially the same as the dimension in the axial direction of the non-rotating side engaging portion 13 (non-rotating side stopper surface 14), and is approximately $2/5$ of the axial direction thickness dimension of the base plate portion 15 (for example, it is about 3.5 mm in the case of a ball screw device incorporated in an electric booster device).

The rotating-side engaging groove portion 18f has a flat stepped surface 23 facing in the circumferential direction at the end portion on the one side in the circumferential direction where the depth in the axial direction is the smallest. Therefore, the end portion on the one side in the circumferential direction of the groove bottom surface 27a of the rotating-side engaging groove portion 18f is connected to the side surface 15a on the other side in the axial direction of the base plate portion 15 through the stepped surface 23. In the illustrated example, the dimension in the axial direction of the stepped surface 23 is approximately $1/4$ of the rotating-side stopper surface 22 (for example, it is about 1.0 mm in the case of a ball screw device incorporated in an electric booster device). In a case of implementing the present invention, the stepped surface can be omitted. In this case, the end portion on the one side in the circumferential direction of the groove bottom surface of the rotating-side engaging groove portion and the side surface on the other side in the axial direction of the driving member can be smoothly connected without a stepped surface.

Figure 25:
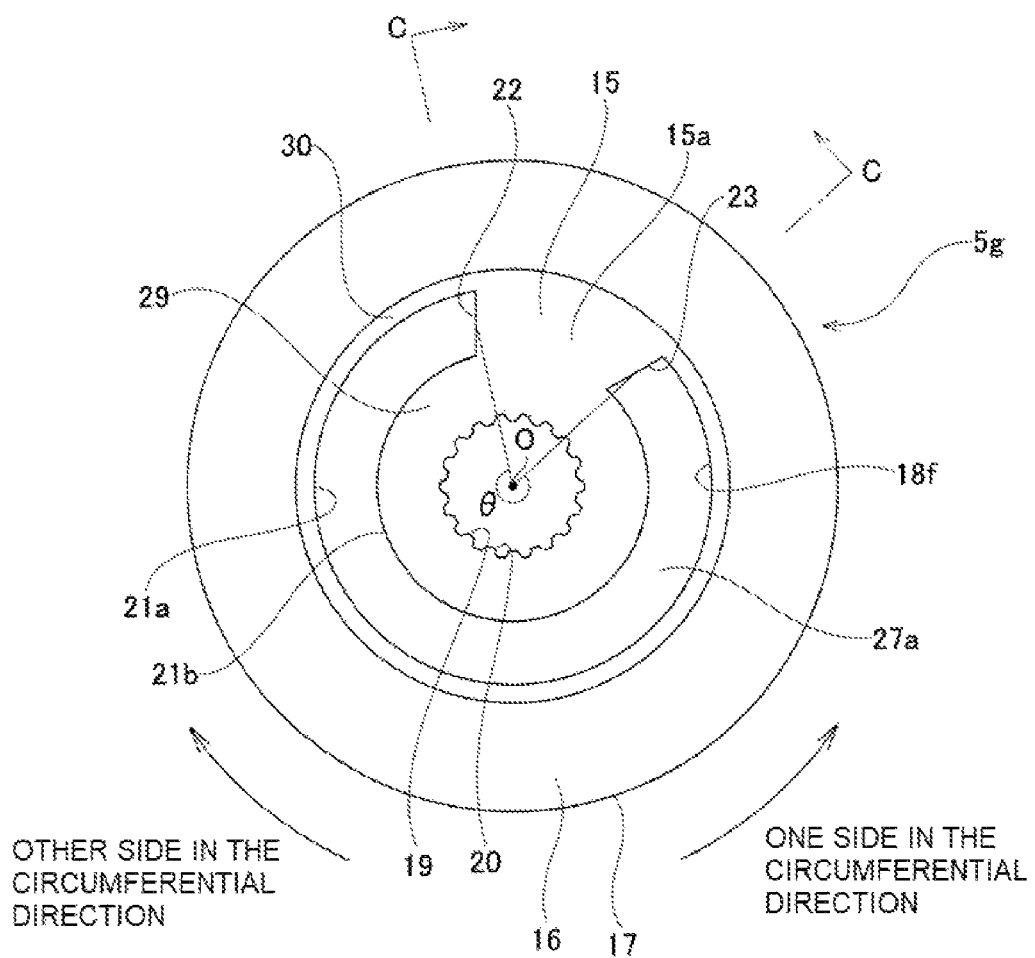
FIG. 25 is a front view of the driving member of the ball screw device according to the ninth example, as viewed from the other side in the axial direction.
Figure 26:
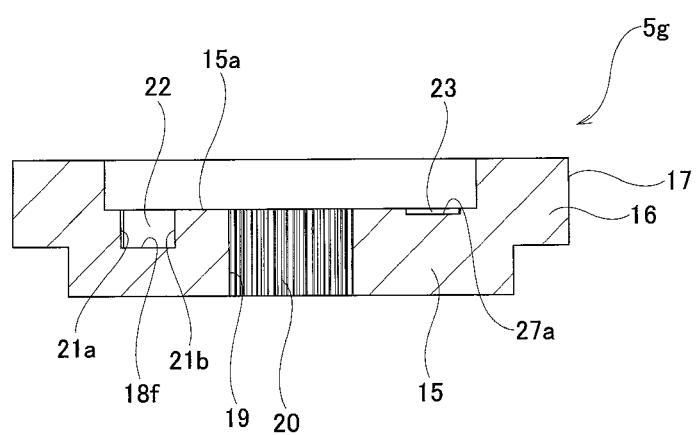
FIG. 26 is a cross-sectional view of section C-O-C in FIG. 25.
Figure 27:
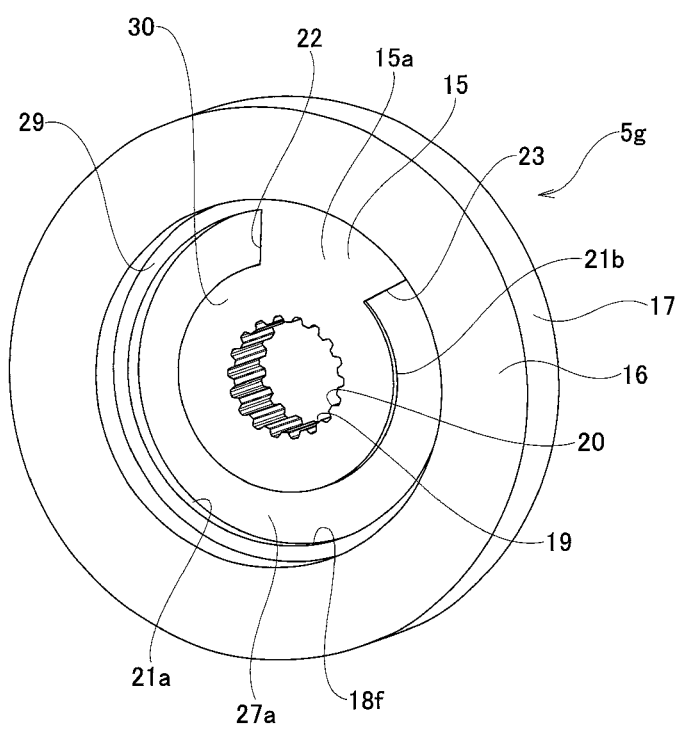
FIG. 27 is a perspective view of the driving member illustrated in FIG. 25.

In this example, as illustrated in FIG. 25, the center angle $\theta$ of the rotating-side engaging groove portion 18f is approximately 300 degrees. Therefore, the rotating-side engaging groove portion 18f is formed in a range of ⅚ of the entire side surface 15a on the other side in the axial direction of the base plate portion 15. The formation range (center angle θ) in the circumferential direction of the rotating-side engaging groove portion 18f is determined based on such as the size of the lead angle β1 of the shaft-side ball thread groove 10 and the size of the engagement allowance δ between the non-rotating side stopper surface 14 and the rotating-side stopper surface 22.

Also in this example, when the nut 3 moves to the one side in the axial direction relative to the screw shaft 2 and approaches the stroke end, the end portion (tip end portion) on the one side in the axial direction of the non-rotating side engaging portion 13 enters inside the rotating-side engaging groove portion 18f provided in the driving member 5g. Further, as the nut 3 moves toward the one side in the axial direction, while increasing the amount of entry in the axial direction into the rotating-side engaging groove portion 18f, the nut 3 relatively moves inside the rotating-side engaging groove portion 18f from the one side in the circumferential direction toward the other side in the circumferential direction. In this example, since the inclination angle α1 of the groove bottom surface 27a of the rotating-side engaging groove portion 18f is set to the same size as the lead angle β1 of the shaft-side ball thread groove 10, the non-rotating side engaging portion 13 relatively moves inside the rotating-side engaging groove portion 18f toward the other side in the circumferential direction in the order of A-B-C as in FIG. 28 with a gap 28 of a certain size interposed between the end surface on the one side in the axial direction of the non-rotating side engaging portion 13 and the groove bottom surface 27a. When the nut 3 reaches the stroke end on the one side in the axial direction, the non-rotating side engaging portion 13 engages with the rotating-side engaging groove portion 18f in the circumferential direction at the end portion on the other side in the circumferential direction of the rotating-side engaging groove portion 18f. Also in this example, even in a state where the non-rotating side stopper surface 14 and the rotating-side stopper surface 22 are in surface contact, the gap 28 exists between the end surface on the one side in the axial direction of the non-rotating side engaging portion 13 and the groove bottom surface 27a.

Figure 28:
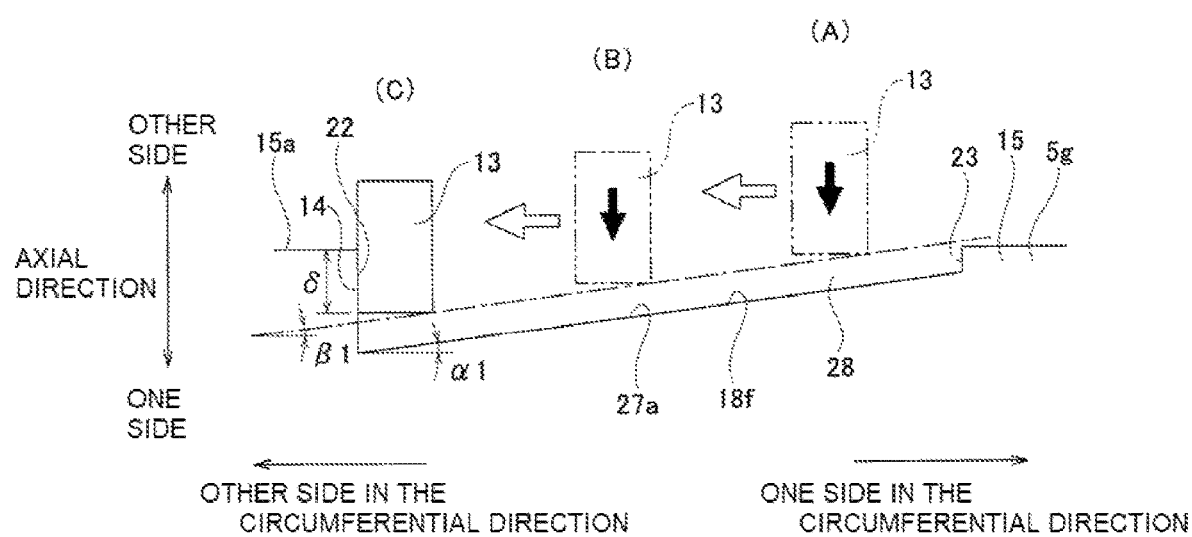
FIG. 28 is a view corresponding to FIG. 8, and illustrates the ball screw device according to the ninth example.

Also in this example, when the driving member 5g is rotationally driven toward the other side in the circumferential direction, the non-rotating side engaging portion 13 moves inside the rotating-side engaging groove portion 18f toward the one side in the circumferential direction and to the other side in the axial direction in the order of C-B-A as in FIG. 28 with the gap 28 interposed between the end surface on the one side in the axial direction and the groove bottom surface 27a. Further, the non-rotating side engaging portion 13 moves from end portion on the one side in the circumferential direction of the rotating-side engaging groove portion 18f to the outside of the rotating-side engaging groove portion 18f without contacting the stepped surface 23.

Also in this example, since the rotating-side engaging groove portion 18f is a bottomed groove, compared to the case where the rotating-side engaging groove portion is a through groove, it is possible to suppress the reduction in strength of the driving member 5g due to the formation of the rotating-side engaging groove portion.

In this example, the depth in the axial direction of the rotating-side engaging groove portion 18f becomes larger from the one side in the circumferential direction toward the other side in the circumferential direction. Therefore, compared to the case where the depth in the axial direction of the rotating-side engaging groove portion 18f is constant over the circumferential direction as in the eighth example, the amount of processing of the rotating-side engaging groove portion 18f can be reduced. As a result, the number of man-hours for processing the driving member 5g can be reduced, and the manufacturing cost can be reduced. Further, compared to the case where the depth in the axial direction of the rotating-side engaging groove portion 18f is constant in the circumferential direction, the thickness dimension in the axial direction of the base plate portion 15 of the driving member 5g can be secured in the portion excluding the end portion on the other side in the circumferential direction of the portion where the rotating-side engaging groove portion 18f is formed. Accordingly, the rigidity and strength of the driving member 5g can be secured.

Further, since the inclination angle α1 of the groove bottom surface 27a of the rotating-side engaging groove portion 18f is set to the same size as the lead angle β1 of the shaft-side ball thread groove 10, the non-rotating side engaging portion 13 can be moved in the circumferential direction relative to the rotating-side engaging groove portion 18f with a gap 28 having a certain size interposed between the end surface on the one side in the axial direction of the non-rotating side engaging portion 13 and the groove bottom surface 27a. Due to this, it is possible to prevent interference between the end surface on the one side in the axial direction of the non-rotating side engaging portion 13 and the groove bottom surface 27a. Therefore, since the end surface on the one side in the axial direction of the non-rotating side engaging portion 13 and the groove bottom surface 27a interfere with each other before the non-rotating side stopper surface 14 and the rotating-side stopper surface 22 engage in the circumferential direction, the position of the stroke end of the nut 3 can be prevented from being deviated.

Also in this example, the rotating-side engaging groove portion 18f is formed in the intermediate portion in the radial direction of the side surface 15a on the other side in the axial direction of the base plate portion 15. That is, in this example as well, the rotating-side stopper surface 22 is connected to the outer diameter-side cylindrical portion 29 having a partially cylindrical shape, which is formed in a portion on the outer-side in the radial direction of the rotating-side engaging groove portion 18f of the base plate portion 15 and protrudes more to the other side in the axial direction than the groove bottom surface 27a, and to the inner diameter-side cylindrical portion 30 having a partially cylindrical shape, which is formed in a portion on the inner-side portion in the radial direction of the rotating-side engaging groove portion 18f of the base plate portion 15 and protrudes more to the other side in the axial direction than the groove bottom surface 27a. Therefore, the rigidity of the rotating-side stopper surface 22 can be improved. Here, in a case of implementing the present invention, the rigidity of the rotating-side stopper surface can be improved by connecting the rotating-side stopper surface to at least one of the outer diameter-side cylindrical portion and the inner diameter-side cylindrical portion.

Other Configurations and operational effects of the ninth example are the same as in the first example.

Tenth Example

Figure 29:
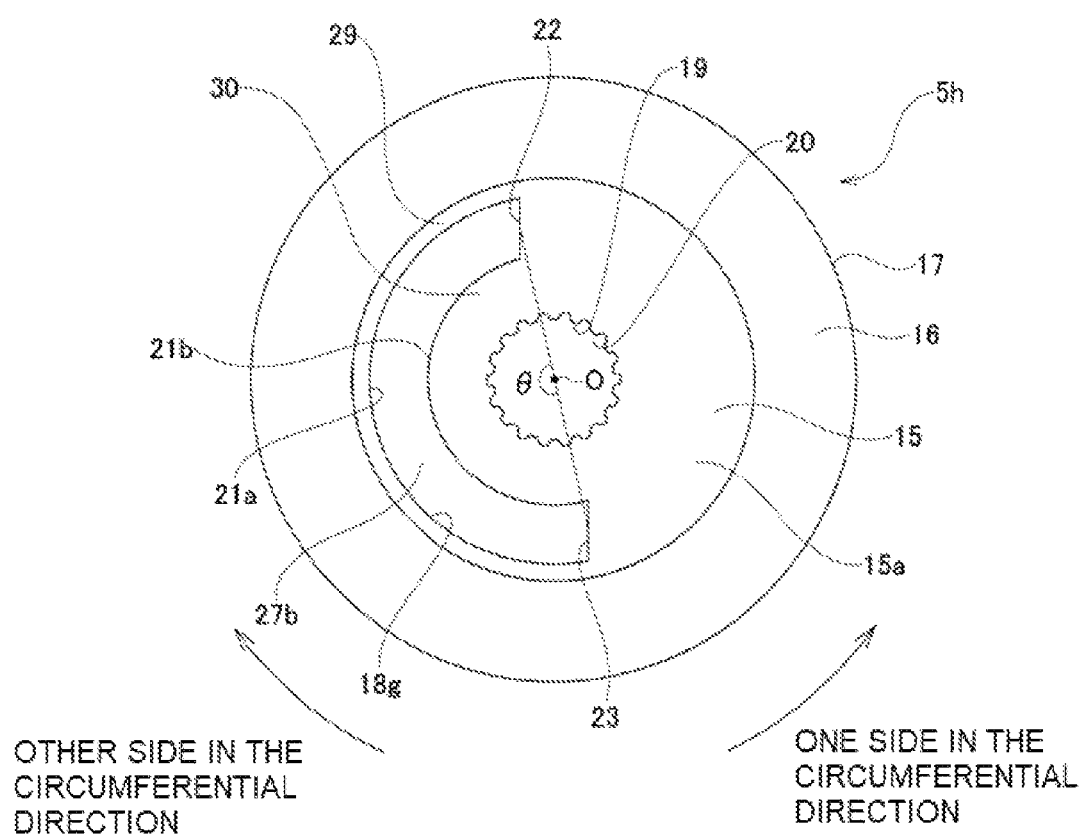
FIG. 29 is a front view of a driving member of a ball screw device according to a tenth example of an embodiment of the present invention, as viewed from the other side in the axial direction.
Figure 30:
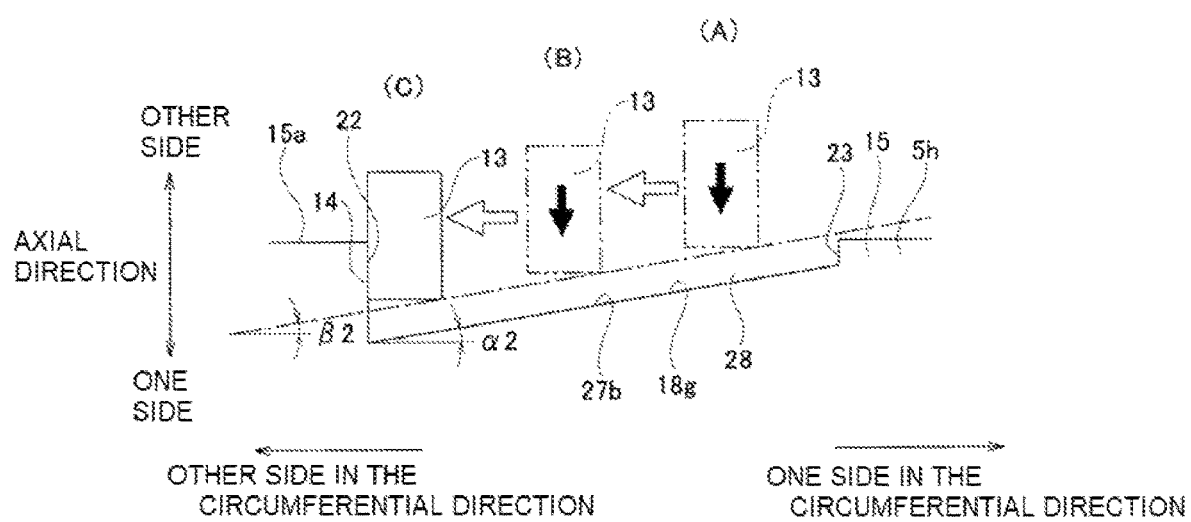
FIG. 30 is a view corresponding to FIG. 8, and illustrates the ball screw device according to the tenth example.

A tenth example of an embodiment of the present invention will be described with reference to FIG. 29 to FIG. 30.

In the case of this example as well, as in the ninth example, the inclination angle α2 of the groove bottom surface 27b of the rotating-side engaging groove portion 18g with respect to the virtual plane perpendicular to the center axis of the driving member 5h is the same as the lead angle 62 of the shaft-side ball thread groove 10 (α2=β2). However, in this example, the lead angle 62 of the shaft-side ball thread groove 10 and the inclination angle α2 of the groove bottom surface 27b of the rotating-side engaging groove portion 18g are set to larger values than in the construction of the ninth example (β2>β1, α2>α1).

In this example, the center angle θ of the rotating-side engaging groove portion 18g is approximately 180 degrees. For this reason, the rotating-side engaging groove portion 18g is formed in a half area of the entire base plate portion 15.

In this example, compared to the construction of the ninth example, the processing range of the rotating-side engaging groove portion 18g can be made smaller. As a result, it is advantageous in increasing the rigidity and strength of the driving member 5h.

Other Configurations and operational effects of the tenth example are the same as in the first example and the ninth example.

Eleventh Example

Figure 31:
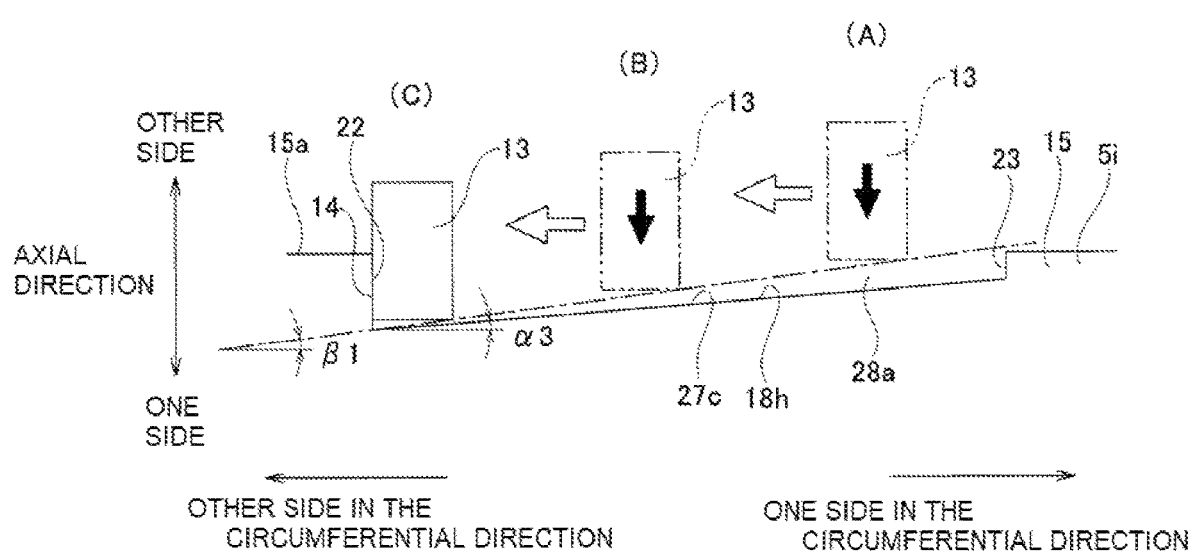
FIG. 31 is a view corresponding to FIG. 8, and illustrates a ball screw device according to an eleventh example of an embodiment of the present invention.

An eleventh example of an embodiment of the present invention will be described with reference to FIG. 31.

In this example, unlike the ninth example and the tenth example, the inclination angle α3 of the groove bottom surface 27c of the rotating-side engaging groove portion 18h with respect to the virtual plane perpendicular to the center axis of the driving member 5i is smaller than the lead angle 61 of the shaft-side ball thread groove 10 (α3<β1).

Therefore, the gap 28a formed between the end surface on the one side in the axial direction of the non-rotating side engaging portion 13 entering the rotating-side engaging groove portion 18h and the groove bottom surface 27c becomes smaller as the non-rotating side engaging portion 13 relatively moves inside the rotating-side engaging groove portion 18h to the other side in the circumferential direction. However, also in this example, even in a state where the non-rotating side stopper surface 14 and the rotating-side stopper surface 22 are in surface contact with each other, the inclination angle α3 of the groove bottom surface 27c and the dimension in the axial direction of the rotating-side stopper surface 22 and the like are regulated so that the gap 28a between the end surface on the one side in the axial direction of the non-rotating side engaging portion 13 and the groove bottom surface 27c does not become zero.

In this example, compared to the construction of the ninth example, it is possible to reduce the amount of processing of the rotating-side engaging groove portion 18h. As a result, the number of man-hours for processing the driving member 5i can be reduced, and the manufacturing cost can be reduced. Further, it is advantageous in ensuring the rigidity and strength of the driving member 5i.

Other Configurations and operational effects of the eleventh example are the same as in the first example and the ninth example.

Twelfth Example

Figure 32:
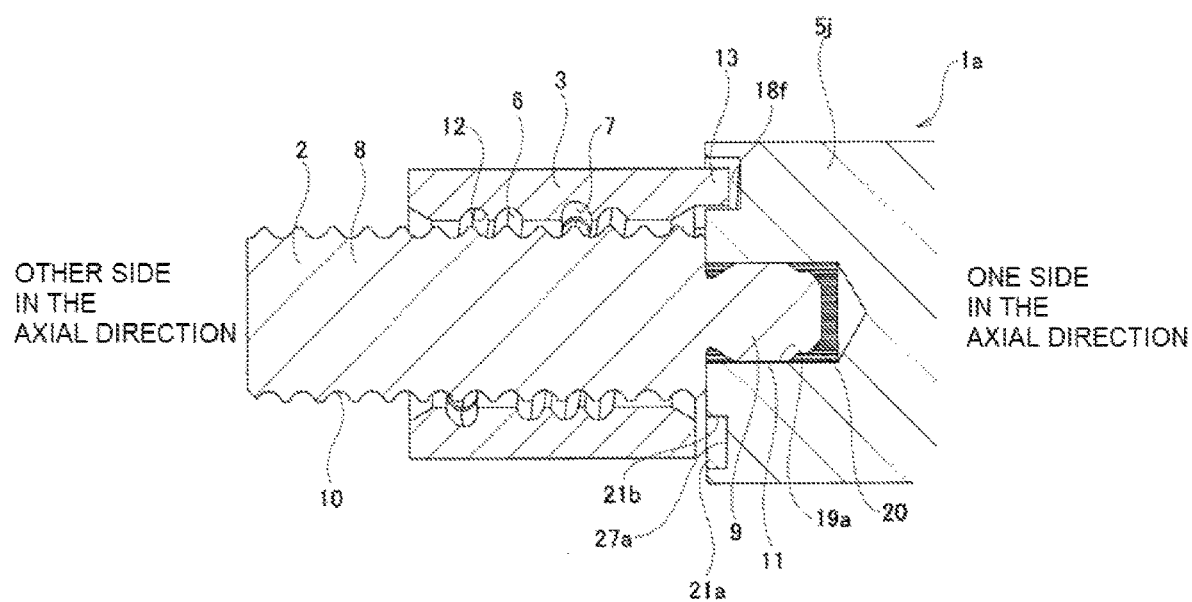
FIG. 32 is a view corresponding to FIG. 2, and illustrates a ball screw device according to a twelfth example of an embodiment of the present invention.

A twelfth example of an embodiment of the present invention will be described with reference to FIG. 32.

In the ball screw device 1a of this example, a motor shaft is used as the driving member 5j. A rotor (not illustrated) is supported on a portion on the one side in the axial direction of the driving member 5j, and a stator (not illustrated) is arranged around the rotor. The driving member 5j has a mounting hole 19a that is open in the central portion in the radial direction of the side surface (end surface) on the other side in the axial direction. Female spline teeth 20 are formed on the inner-circumferential surface of the mounting hole 19a. By spline-engaging the female spline teeth 20 formed on the inner-circumferential surface of the mounting hole 19a and the male spline teeth 11 formed on the outer-circumferential surface of the fitting shaft portion 9, the driving member 5j is externally fitted to the fitting shaft portion 9 so as not to be able to rotate relative to the fitting shaft portion 9.

The driving member 5j includes a rotating-side engaging groove portion 18f on a side surface on the other side in the axial direction. The rotating-side engaging groove portion 18f has a depth in the axial direction that increases from the one side in the circumferential direction toward the other side in the circumferential direction, and regulates the stroke end of the nut 3 by engaging with the non-rotating side engaging portion 13 provided on the nut 3 at the end portion on the other side in the circumferential direction.

Also in this example, regulation of the stroke end of the nut 3, which is a linear motion element, can be achieved with a small number of parts, and the ball screw device 1a can be more compact.

Other Configurations and operational effects of the twentieth example are the same as in the first example and the ninth example.

Thirteenth Example

Figure 33:
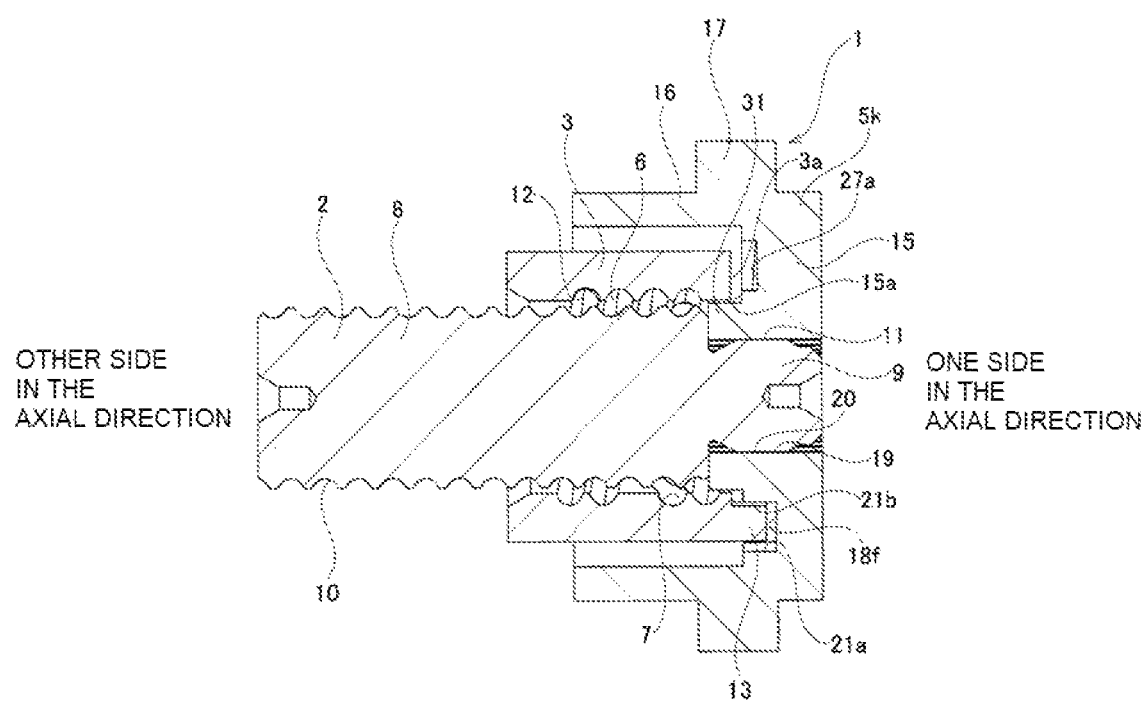
FIG. 33 is a view corresponding to FIG. 2, and illustrates a ball screw device according to a thirteenth example of an embodiment of the present invention.

A thirteenth example of an embodiment of the present invention will be described with reference to FIG. 33.

In this example, an annular protruding portion 31 having an annular shape protruding toward the other side in the axial direction is provided on the inner-side in the radial direction of the rotating-side engaging groove portion 18 of the side surface 15a on the other side in the axial direction of the base plate portion 15 of the driving member 5k. The end surface on the other side in the axial direction of the annular protruding portion 31 abuts against the end surface on the one side in the axial direction of the screw portion 8 of the screw shaft 2.

The outer diameter of the annular protruding portion 31 is slightly smaller than the inner diameter of the nut 3 and larger than the root diameter of the shaft-side ball thread groove 10 formed on the outer-circumferential surface of the screw shaft 2. Preferably, the outer diameter of the annular protruding portion 31 can be made the same as the outer diameter of the screw thread of the shaft-side ball thread groove 10. More preferably, the outer diameter of the annular protruding portion 31 can be made larger than the outer diameter of the screw thread of the shaft-side ball thread groove 10.

In the case of this example, in a state where the non-rotating side stopper surface 14 provided on the nut 3 and the rotating-side stopper surface 22 provided on the driving member 5k are engaged in the circumferential direction, the annular protruding portion 31 is inserted in the axial direction into the inner diameter side of the end portion on the one side in the axial direction of the nut 3. Furthermore, the outer-circumferential surface of the annular protruding portion 31 and the end portion on the one side in the axial direction of the inner-circumferential surface of the nut 3 are closely faced over the entire circumference.

In this example, when the nut 3 moves to the one side in the axial direction relative to the screw shaft 2, by inserting the annular protruding portion 31 into the inner diameter side of the end portion on the one side in the axial direction of the nut 3, the grease filled inside the nut 3 can be pushed back to the other side in the axial direction by the annular protruding portion 31. As a result, it is possible to effectively prevent grease from accumulating at the end portion on the one side in the axial direction of the inner-circumferential surface of the nut 3 and leaking out from the opening on the one side in the axial direction of the nut 3.

Other Configurations and operational effects of the thirteenth example are the same as in the first example and the ninth example.

Fourteenth Example

Figure 34:
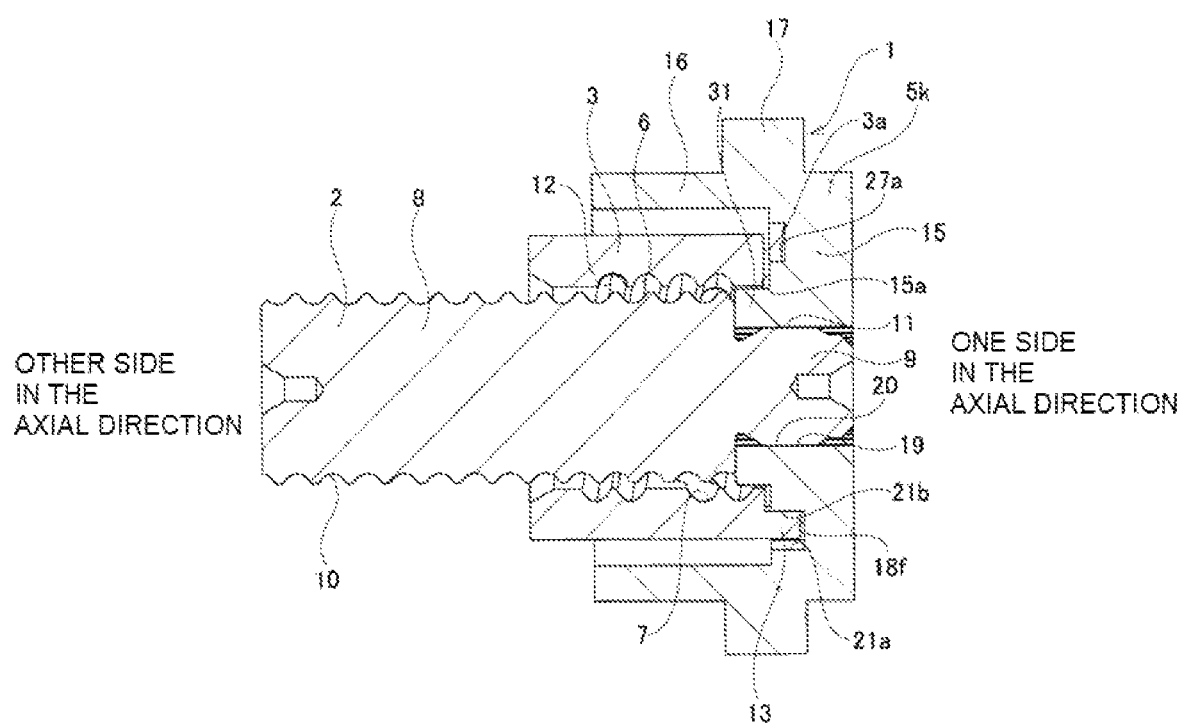
FIG. 34 is a view corresponding to FIG. 2, and illustrates a ball screw device according to a fourteenth example of an embodiment of the present invention.
Figure 35:
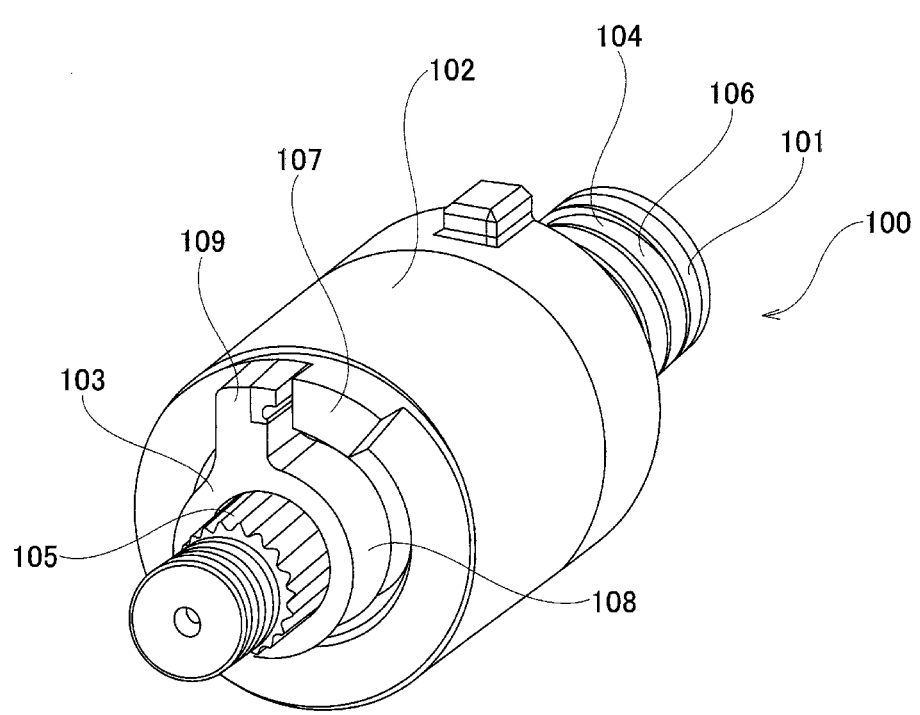
FIG. 35 is a perspective view of a ball screw device having a conventional structure.

A fourteenth example of an embodiment of the present invention will be described with reference to FIG. 34.

This example is a modification of the thirteenth example. In this example, in a state where the non-rotating side stopper surface 14 provided on the nut 3 and the rotating-side stopper surface 22 provided on the driving member 5k are engaged in the circumferential direction, the outer-circumferential surface of the annular protruding portion 31 and the end portion on the one side in the axial direction of the inner-circumferential surface of the nut 3 are closely faced over the entire circumference, and the side surface 15a on the other side in the axial direction of the base plate portion 15 of the driving member 5k and the side surface 3a on the one side in the axial direction of the nut 3 are closely faced over the entire circumference.

In this example, when the annular protruding portion 31 is inserted in the axial direction into the inner diameter side of the end portion on the one side in the axial direction of the nut 3, it is possible to suppress leakage of grease to the outside from the gap between the side surface 15a on the other side in the axial direction of the base plate portion 15 of the driving member 5k and the side surface 3a on the one side in the axial direction of the nut 3.

Other Configurations and operational effects of the fourteenth example are the same as in the first example, the ninth example, and the thirteenth example.

Although an embodiment of the present invention has been descried above, the present invention is not limited to this and can be appropriately modified within a range that does not deviate from the spirit of the invention. Further, the construction of each example of an embodiment of the present invention may be appropriately combined and implemented as long as there is no contradiction.

In each example of an embodiment of the present invention, the non-rotating side engaging portion having a fan column shape was described as an example of the protruding non-rotating side engaging portion, however, in a case of implementing the present invention, the shape of the non-rotating side engaging portion is not limited to the fan column shape, and other shapes such as a columnar shape and a rectangular columnar shape can be adopted.

In a case of implementing the present invention, when the rotating-side engaging groove portion provided in the driving member is configured by two or more rotating-side engaging groove portions, the number of the rotating-side engaging groove portions is not limited to two or three, and it can be four or more. Further, the size of the center angle of the two or more rotating-side engaging groove portions can be made different from each other, and the two or more rotating-side engaging groove portions can be arranged so as to be unevenly spaced in the circumferential direction of the driving member.

In each example of an embodiment of the present invention, the fitting shaft portion of the screw shaft has male spline teeth on the outer-circumferential surface, and the driving member has a mounting hole having female spline teeth on the inner-circumferential surface, and a structure in which the driving member is spline-fitted to the fitting shaft portion has been described. However, in a case of implementing the present invention, the structure for fixing the driving member to the fitting shaft portion is not particularly limited. For example, the fitting shaft portion may have an elliptical cross section (racetrack oval shape) and has a width across flat shape having a pair of flat outer surfaces parallel to each other on the outer-circumferential surface, and the mounting hole of the driving member may be an oblong hole (stadium shaped hole) and may have a width across flat shape having a pair of flat inner surfaces parallel to each other on the inner-circumferential surface, and a structure in which the driving member is non-circularly fitted to the fitting shaft portion may be adopted.

In each example of an embodiment of the present invention, the structure in which the circulation groove is formed directly on the inner-circumferential surface of the nut has been described. However, in a case of implementing the present invention, it is also possible to form the circulation groove in a circulation component (for example, a top) separate from the nut and fix the circulation component to the nut.

REFERENCE SIGNS LIST

1, 1a Ball screw device
2 Screw shaft
3 Nut
3a Side surface
4 Balls
5, 5a-5k Driving member
6 Load path
7 Circulation groove
8 Screw portion
9 Fitting shaft portion
10 Shaft-side ball thread groove
11 Male spline teeth
12 Nut-side ball thread groove
13, 13a, 13b, 13c Non-rotating side engaging portion
14 Non-rotating side stopper surface
15 Base plate portion
15a Side surface
16 Cylindrical portion
17 Torque input portion
18, 18a-18h Rotating-side engaging groove portion
19, 19a Mounting hole
20 Female spline teeth
21a, 21b Inner-side surface
22 Rotating-side stopper surface
23 Stepped surface
24, 24a Inclined surface
25 Connecting portion
26 Reinforcing portion
27, 27a-27c Groove bottom surface
28, 28a Gap
29 Outer diameter-side cylindrical portion
30 Inner diameter-side cylindrical portion
31 Annular protruding portion 100 Ball screw device
101 Screw shaft
102 Nut
103 Stopper
104 Screw portion
105 Fitting shaft portion
106 Shaft-side ball thread groove
107 Engaging portion
108 Boss portion
109 Claw portion

The invention claimed is:

1. A ball screw device comprising:
a screw shaft having a shaft-side ball thread groove having a spiral shape on an outer-circumferential surface thereof, the screw shaft rotationally moving during use,
a nut having a nut-side ball thread groove having a spiral shape on an inner-circumferential surface thereof and a non-rotating side engaging portion having a protruding shape at an end portion on one side in an axial direction, the nut linearly moving during use,
balls arranged between the shaft-side ball thread groove and the nut-side ball thread groove, and
a driving member fixed to the screw shaft so as not to be able to rotate relative to the screw shaft, and rotationally driving the screw shaft,
the driving member having an arc-shaped rotating-side engaging groove portion into which the non-rotating side engaging portion can be inserted in the axial direction, and which can be engaged with the non-rotating side engaging portion in a circumferential direction at an end portion in the circumferential direction, wherein
the rotating-side engaging groove portion is a through groove that penetrates the driving member in the axial direction or a bottomed groove that is open to a side surface on the other side in the axial direction of the driving member.

2. The ball screw device according to claim 1, wherein the rotating-side engaging groove portion is a bottomed groove having a constant depth in the axial direction.

3. The ball screw device according to claim 1, wherein the rotating-side engaging groove portion is a bottomed groove having a depth in the axial direction that changes in the circumferential direction.

4. The ball screw device according to claim 3, wherein an inclination angle of the groove bottom surface of the rotating-side engaging groove portion with respect to a virtual plane perpendicular to a center axis of the driving member is equal to a lead angle of the shaft-side ball thread groove or is smaller than the lead angle of the shaft-side ball thread groove.

5. A ball screw device comprising:
a screw shaft having a shaft-side ball thread groove having a spiral shape on an outer-circumferential surface thereof, the screw shaft rotationally moving during use,
a nut having a nut-side ball thread groove having a spiral shape on an inner-circumferential surface thereof and a non-rotating side engaging portion having a protruding shape at an end portion on one side in an axial direction, the nut linearly moving during use,
balls arranged between the shaft-side ball thread groove and the nut-side ball thread groove, and
a driving member fixed to the screw shaft so as not to be able to rotate relative to the screw shaft, and rotationally driving the screw shaft,
the driving member having an arc-shaped rotating-side engaging groove portion into which the non-rotating side engaging portion can be inserted in the axial direction, and which can be engaged with the non-rotating side engaging portion in a circumferential direction at an end portion in the circumferential direction, wherein
the rotating-side engaging groove portion is configured by two or more rotating-side engaging groove portions.

6. The ball screw device according to claim 5, wherein the two or more rotating-side engaging groove portions are arranged so as to be evenly spaced in the circumferential direction of the driving member.

7. The ball screw device according to claim 1, wherein a size of a center angle of the rotating-side engaging groove portion is 36 degrees or more and 324 degrees or less.

8. A ball screw device comprising:
a screw shaft having a shaft-side ball thread groove having a spiral shape on an outer-circumferential surface thereof, the screw shaft rotationally moving during use,
a nut having a nut-side ball thread groove having a spiral shape on an inner-circumferential surface thereof and a non-rotating side engaging portion having a protruding shape at an end portion on one side in an axial direction, the nut linearly moving during use,
balls arranged between the shaft-side ball thread groove and the nut-side ball thread groove, and
a driving member fixed to the screw shaft so as not to be able to rotate relative to the screw shaft, and rotationally driving the screw shaft,
the driving member having an arc-shaped rotating-side engaging groove portion into which the non-rotating side engaging portion can be inserted in the axial direction, and which can be engaged with the non-rotating side engaging portion in a circumferential direction at an end portion in the circumferential direction, wherein
a size of a center angle of the rotating-side engaging groove portion is larger than a size of a center angle of the non-rotating side engaging portion.

9. A ball screw device comprising:
a screw shaft having a shaft-side ball thread groove having a spiral shape on an outer-circumferential surface thereof, the screw shaft rotationally moving during use,
a nut having a nut-side ball thread groove having a spiral shape on an inner-circumferential surface thereof and a non-rotating side engaging portion having a protruding shape at an end portion on one side in an axial direction, the nut linearly moving during use,
balls arranged between the shaft-side ball thread groove and the nut-side ball thread groove, and
a driving member fixed to the screw shaft so as not to be able to rotate relative to the screw shaft, and rotationally driving the screw shaft,
the driving member having an arc-shaped rotating-side engaging groove portion into which the non-rotating side engaging portion can be inserted in the axial direction, and which can be engaged with the non-rotating side engaging portion in a circumferential direction at an end portion in the circumferential direction, wherein
a size of a center angle of a portion of the driving member that is deviated in the circumferential direction from the rotating-side engaging groove portion is larger than a size of a center angle of the non-rotating side engaging portion.

10. A ball screw device comprising:

a screw shaft having a shaft-side ball thread groove having a spiral shape on an outer-circumferential surface thereof, the screw shaft rotationally moving during use, a nut having a nut-side ball thread groove having a spiral shape on an inner-circumferential surface thereof and a non-rotating side engaging portion having a protruding shape at an end portion on one side in an axial direction, the nut linearly moving during use, balls arranged between the shaft-side ball thread groove and the nut-side ball thread groove, and a driving member fixed to the screw shaft so as not to be able to rotate relative to the screw shaft, and rotationally driving the screw shaft, the driving member having an arc-shaped rotating-side engaging groove portion into which the non-rotating side engaging portion can be inserted in the axial direction, and which can be engaged with the non-rotating side engaging portion in a circumferential direction at an end portion in the circumferential direction, wherein the rotating-side engaging groove portion has a reinforcing portion in an intermediate portion in the circumferential direction that radially connects an inner-side surface on an outer-side in a radial direction and an inner-side surface on an inner-side in the radial direction.

11. A ball screw device comprising:

a screw shaft having a shaft-side ball thread groove having a spiral shape on an outer-circumferential surface thereof, the screw shaft rotationally moving during use, a nut having a nut-side ball thread groove having a spiral shape on an inner-circumferential surface thereof and a non-rotating side engaging portion having a protruding shape at an end portion on one side in an axial direction, the nut linearly moving during use, balls arranged between the shaft-side ball thread groove and the nut-side ball thread groove, and a driving member fixed to the screw shaft so as not to be able to rotate relative to the screw shaft, and rotationally driving the screw shaft, the driving member having an arc-shaped rotating-side engaging groove portion into which the non-rotating side engaging portion can be inserted in the axial direction, and which can be engaged with the non-rotating side engaging portion in a circumferential direction at an end portion in the circumferential direction, wherein the driving member has a torque input portion on an outer-circumferential surface thereof, wherein the screw shaft has a screw portion having the shaft-side ball thread groove formed on an outer-circumferential surface thereof and a fitting shaft portion which is arranged on the one side in the axial direction of the screw portion and to which the driving member is externally fitted and fixed so as not to be able to rotate relative to the driving member, and the torque input portion is arranged at a position radially overlapping a portion of the rotating-side engaging groove portion that engages with the non-rotating side engaging portion.

12. The ball screw device according to claim 11, wherein the driving member is one of a gear, a pulley, and a sprocket.

13. The ball screw device according to claim 1, wherein the driving member is a motor shaft.

* * * * *